(12) United States Patent
Nishigata et al.

(10) Patent No.: US 8,934,323 B2
(45) Date of Patent: Jan. 13, 2015

(54) OPTICAL DISK DEVICE, CONTROL METHOD THEREFOR, PROGRAM, AND INFORMATION RECORDING MEDIUM

(75) Inventors: Naoyuki Nishigata, Chiba (JP); Yasuo Hosaka, Kanagawa (JP)

(73) Assignees: Sony Corporation, Tokyo (JP); Sony Computer Entertainment Inc., Tokyo (JP)

( * ) Notice: Subject to any disclaimer, the term of this patent is extended or adjusted under 35 U.S.C. 154(b) by 0 days.

(21) Appl. No.: 13/203,357

(22) PCT Filed: Feb. 8, 2010

(86) PCT No.: PCT/JP2010/051784
§ 371 (c)(1),
(2), (4) Date: Oct. 3, 2011

(87) PCT Pub. No.: WO2010/101000
PCT Pub. Date: Sep. 10, 2010

(65) Prior Publication Data
US 2012/0014239 A1    Jan. 19, 2012

(30) Foreign Application Priority Data

Mar. 2, 2009  (JP) ................................. 2009-047689
Mar. 2, 2009  (JP) ................................. 2009-047690

(51) Int. Cl.
*G11B 7/005*  (2006.01)
*G11B 20/10*  (2006.01)
(Continued)

(52) U.S. Cl.
CPC ........ *G11B 20/10009* (2013.01); *G11B 19/046* (2013.01); *G11B 7/13927* (2013.01);
(Continued)

(58) Field of Classification Search
CPC ............ G11B 7/005; G11B 20/10009; G11B 7/13927; G11B 19/046
USPC ........... 369/53.35, 44.23, 44.25, 53.11, 53.12
See application file for complete search history.

(56) References Cited

U.S. PATENT DOCUMENTS 6,496,453 B2 *  12/2002  Asada et al. ............... 369/44.23
7,301,869 B2    11/2007  Sasaki
(Continued)

FOREIGN PATENT DOCUMENTS

CN    1412591 A    4/2003
CN    1480931 A    3/2004
(Continued)

OTHER PUBLICATIONS

International Preliminary Report on Patentability for corresponding Application PCT/JP2010/051784, dated Sep. 13, 2011.
(Continued)

*Primary Examiner* — Thomas Alunkal
(74) *Attorney, Agent, or Firm* — Matthew B. Dernier, Esq.; Gibson & Dernier LLP

(57) ABSTRACT

Provided is an optical disc device capable of correcting a value of a control parameter during an operation of reading information from an optical disc medium. The optical disc device for reading the information recorded on the optical disc medium under an operation condition corresponding to a value set with respect to a predetermined control parameter corrects the value of the predetermined control parameter by repeatedly executing, while an operation of reading the information from the optical disc medium is being performed, processing of: acquiring, with respect to two values of the predetermined control parameter, evaluation values indicating accuracy of the reading of the information from the optical disc medium, respectively; and updating the value of the predetermined control parameter based on the two acquired evaluation values.

11 Claims, 9 Drawing Sheets

(51) Int. Cl.
*G11B 19/04* (2006.01)
*G11B 7/1392* (2012.01)

(52) U.S. Cl.
CPC .......... *G11B7/005* (2013.01); *G11B 20/10388* (2013.01); *G11B 20/10509* (2013.01); *G11B 2220/2537* (2013.01)
USPC .................................. 369/53.35; 369/44.23

(56) References Cited

U.S. PATENT DOCUMENTS

| | | | |
|---|---|---|---|
| 7,344,077 B2 | 3/2008 | Sagara | |
| 7,379,398 B2 * | 5/2008 | Shimamoto et al. | 369/44.29 |
| 7,382,709 B2 | 6/2008 | Kimura | |
| 7,411,883 B2 | 8/2008 | Kimura | |
| 7,768,880 B2 | 8/2010 | Saganaka | |
| 7,768,885 B2 | 8/2010 | Kitagaki | |
| 2003/0185134 A1 * | 10/2003 | Kimura et al. | 369/112.08 |
| 2004/0017743 A1 * | 1/2004 | Sasaki et al. | 369/44.32 |
| 2004/0213131 A1 * | 10/2004 | Kimura et al. | 369/112.03 |
| 2005/0105446 A1 * | 5/2005 | Sakamoto et al. | 369/112.01 |
| 2006/0164949 A1 * | 7/2006 | Sagara et al. | 369/106 |
| 2006/0221787 A1 * | 10/2006 | Kitagaki et al. | 369/47.5 |
| 2007/0159951 A1 * | 7/2007 | Sagara | 369/106 |
| 2007/0258144 A1 | 11/2007 | Kimura | |

FOREIGN PATENT DOCUMENTS

| | | |
|---|---|---|
| CN | 1540646 A | 10/2004 |
| CN | 1841539 A | 10/2006 |
| CN | 1967676 A | 5/2007 |
| JP | 2004-241081 A | 8/2004 |
| JP | 2005-196947 A | 7/2005 |
| JP | 2006-048875 A | 2/2006 |
| JP | 2006-099928 A | 4/2006 |
| JP | 2007-141406 A | 6/2007 |
| JP | 4001024 B | 10/2007 |
| JP | 2008-041139 A | 2/2008 |

OTHER PUBLICATIONS

International Search Report for corresponding Application PCT/JP2010/051784, dated May 25, 2010.

Office Actions for corresponding Japanese Patent Application No. 2009-047689, dated Oct. 1, 2013.

Office Actions for corresponding Japanese Patent Application No. 2009-047690, dated Oct. 1, 2013.

Office Action for corresponding Chinese Patent Application No. 201080010160.4, dated Sep. 4, 2013.

* cited by examiner

OPTICAL DISK DEVICE, CONTROL METHOD THEREFOR, PROGRAM, AND INFORMATION RECORDING MEDIUM

TECHNICAL FIELD

The present invention relates to an optical disc device for reading information recorded on an optical disc medium such as a CD, a DVD, and a Blu-ray disc (registered trademark), a method of controlling the optical disc device, a program, and an information storage medium.

BACKGROUND ART

In recent years, various optical disc media are used as information recording media. An optical disc device is used to read information recorded on such an optical disc medium. The optical disc device includes an optical pickup which irradiates the optical disc medium with light to detect reflected light from the optical disc medium. The optical disc device controls a drive system for relatively moving the optical pickup with respect to a surface of the optical disc medium to move the optical pickup to a position at which the information can be read. In this manner, the optical disc device reads the information from the optical disc medium.

When the optical disc device controls respective portions such as the optical pickup and the drive system to read information from the optical disc medium, various control parameters are set regarding the control. One example of those control parameters is a parameter regarding spherical aberration correction of an objective lens (hereinbelow, referred to as SA parameter). For example, inside the optical pickup, there is provided a collimator lens in order to correct the spherical aberration of the objective lens used for focusing light onto the optical disc medium. Then, by appropriately adjusting the position of the collimator lens according to the set value of the SA parameter, the spherical aberration of the objective lens is corrected, with the result that the light from the objective lens can be focused onto the optical disc medium with high accuracy. As described above, the optical disc device can be improved in accuracy of reading information from the optical disc medium by setting appropriate values for the control parameters such as the SA parameter, and controlling the respective portions of the device under an operation condition corresponding to the set values.

The values to be set for those control parameters vary depending on the type, the individual variability, and the like of the optical disc medium being a reading target. Thus, when an optical disc medium is newly set inside the device, the optical disc device first performs processing of adjusting the control parameters before starting the reading of information (for example, see Patent Literature 1). Specifically, this adjustment processing involves the following control. That is, the optical disc device first changes the set value of the control parameter within an assignable range, and attempts the reading of information from the medium by setting several set values, thereby evaluating the corresponding information reading accuracy. Then, by using the evaluation value of the reading accuracy obtained for each of the plurality of set values, such a set value (adjustment value) of the control parameter that can improve the information reading accuracy is calculated, and the calculated value is set as the value of the predetermined control parameter.

PRIOR ART DOCUMENT

Patent Document

Patent Document: JP 4001024 B

SUMMARY OF THE INVENTION

The above-mentioned adjustment processing for the control parameter is usually performed only once when an optical disc medium is newly set inside the device. However, in some cases, a desired set value of the control parameter changes while the device is being used. For example, depending on the material or the like of the objective lens, the lens characteristic of the objective lens changes when the temperature has changed while the optical disc device is being used. As a result, an optimal set value of the SA parameter also changes. However, it takes certain time to perform the above-mentioned adjustment processing for the control parameter. Thus, if such adjustment processing is executed while the device is being used, this may cause the information reading operation to be suspended.

In view of the above-mentioned circumstances, the present invention has been made, and an object thereof is to provide an optical disc device capable of correcting a value of a control parameter during an operation of reading information from an optical disc medium, and also to provide a method of controlling the optical disc device, a program, and an information storage medium.

Further, another object of the present invention is to provide an optical disc device capable of correcting a set value of a control parameter in a relatively short period of time while the device is being used, and also to provide a method of controlling the optical disc device, a program, and an information storage medium.

According to the present invention, there is provided an optical disc device for reading information recorded on an optical disc medium under an operation condition corresponding to a value set with respect to a predetermined control parameter, the optical disc device including a correction portion for correcting the value of the predetermined control parameter by repeatedly executing, while an operation of reading the information from the optical disc medium is being performed, processing of: acquiring, with respect to two values of the predetermined control parameter, evaluation values indicating accuracy of the reading of the information from the optical disc medium, respectively; and updating the value of the predetermined control parameter based on the two acquired evaluation values.

In the above-mentioned optical disc device, the correction portion may determine whether the value of the predetermined control parameter is to be increased or decreased based on a magnitude relation between the two evaluation values acquired with respect to the two values of the predetermined control parameter, respectively.

In the above-mentioned optical disc device, the correction portion may acquire a plurality of the evaluation values with respect to each of the two values of the control parameter, and update the value of the predetermined control parameter based on results of comparing the plurality of the evaluation values acquired for each of the two values.

In the above-mentioned optical disc device, the correction portion may acquire, as one of the evaluation values, a value calculated based on a reproduction signal obtained through the operation of reading the information from the optical disc medium.

According to the present invention, there is also provided a method of controlling an optical disc device for reading information recorded on an optical disc medium under an operation condition corresponding to a value set with respect to a predetermined control parameter, the method including correcting the value of the predetermined control parameter by repeatedly executing, while an operation of reading the information from the optical disc medium is being performed, processing of: acquiring, with respect to two values of the predetermined control parameter, evaluation values indicating accuracy of the reading of the information from the optical disc medium, respectively; and updating the value of the predetermined control parameter based on the two acquired evaluation values.

According to the present invention, there is also provided a computer-readable information storage medium having stored therein a program for controlling an optical disc device for reading information recorded on an optical disc medium under an operation condition corresponding to a value set with respect to a predetermined control parameter, the program causing a computer to function as a correction portion for correcting the value of the predetermined control parameter by repeatedly executing, while an operation of reading the information from the optical disc medium is being performed, processing of: acquiring, with respect to two values of the predetermined control parameter, evaluation values indicating accuracy of the reading of the information from the optical disc medium, respectively; and updating the value of the predetermined control parameter based on the two acquired evaluation values.

According to the present invention, there is also provided an optical disc device for reading information recorded on an optical disc medium under an operation condition corresponding to a value set with respect to a predetermined control parameter, the optical disc device including: a measurement unit for measuring a temperature inside the optical disc device; a first correction portion for correcting the value of the predetermined control parameter by evaluating accuracy of the reading of the information from the optical disc medium; a second correction portion for correcting the value of the predetermined control parameter based on the temperature measured by the measurement unit and a predetermined constant value; and a correction control portion for selectively causing any one of the first correction portion and the second correction portion to execute the correction of the value of the predetermined control parameter at every predetermined timing after the reading of the information from the optical disc medium is started.

In the above-mentioned optical disc device, the correction control portion may cause the correction of the value of the predetermined control parameter to be executed at every timing corresponding to a change in the temperature measured by the measurement unit.

Further, in the above-mentioned optical disc device, the correction control portion may cause the correction of the value of the predetermined control parameter to be executed at every timing when a predetermined condition regarding a reading operation is satisfied for a first time after a predetermined temperature change is measured by the measurement unit.

In the optical disc device, the correction control portion may cause the first correction portion to execute the correction after causing the second correction portion to execute the correction a predetermined number of times.

According to the present invention, there is also provided a method of controlling an optical disc device for reading information recorded on an optical disc medium under an operation condition corresponding to a value set with respect to a predetermined control parameter, the optical disc device including a measurement unit for measuring a temperature inside the optical disc device, the method including correcting the value of the predetermined control parameter selectively through any one of first correction processing and second correction processing at every predetermined timing after the reading of the information from the optical disc medium is started, the first correction processing including correcting the value of the predetermined control parameter by evaluating accuracy of the reading of the information from the optical disc medium, the second correction processing including correcting the value of the predetermined control parameter based on the temperature measured by the measurement unit and a predetermined constant value.

According to the present invention, there is also provided a computer-readable information storage medium having stored therein a program for controlling an optical disc device for reading information recorded on an optical disc medium under an operation condition corresponding to a value set with respect to a predetermined control parameter, the optical disc device including a measurement unit for measuring a temperature inside the optical disc device, the program causing a computer to function as: a first correction portion for correcting the value of the predetermined control parameter by evaluating accuracy of the reading of the information from the optical disc medium; a second correction portion for correcting the value of the predetermined control parameter based on the temperature measured by the measurement unit and a predetermined constant value; and a correction control portion for selectively causing any one of the first correction portion and the second correction portion to execute the correction of the value of the predetermined control parameter at every predetermined timing after the reading of the information from the optical disc medium is started.

DETAILED DESCRIPTION OF THE PREFERRED EMBODIMENTS

Hereinafter, embodiments of the present invention are described in detail referring to the accompanying drawings.

[First Embodiment]

Figure 1:
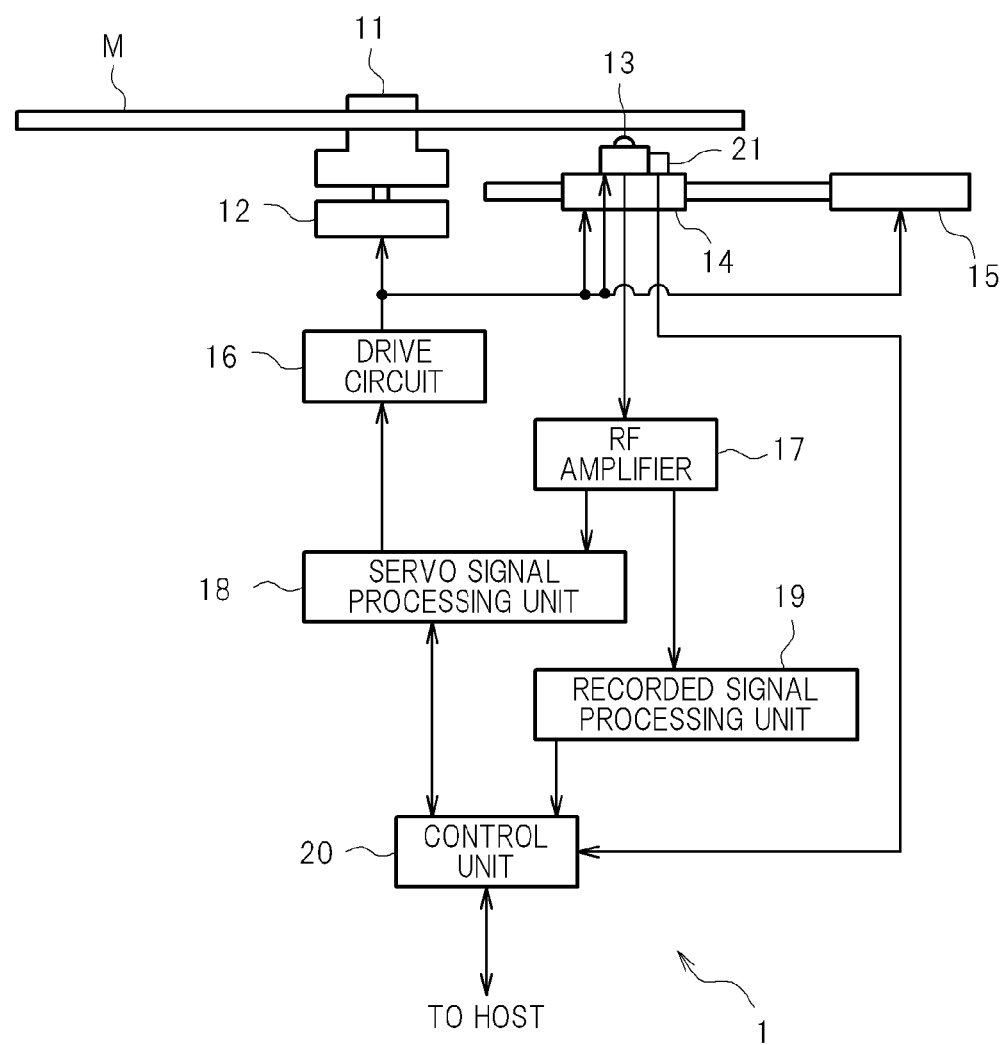
[FIG. 1] A block diagram illustrating a configuration example of an optical disc device according to embodiments of the present invention.

An optical disc device 1 according to a first embodiment of the present invention reads information recorded on an optical disc medium. As illustrated in FIG. 1, the optical disc device 1 includes a medium supporting portion 11, a spindle motor 12, an optical pickup 13, a three-axis actuator 14, a feed motor 15, a drive circuit 16, an RF amplifier 17, a servo signal processing unit 18, a recorded signal processing unit 19, a control unit 20, and a thermistor 21.

Note that, an optical disc medium M, from which the information is to be read by the optical disc device 1, includes a data recording layer on which the information is recorded, and protective layers for protecting the data recording layer, which are provided on both sides of the data recording layer. Hereinafter, a surface of the data recording layer is referred to as a signal surface. The optical disc device 1 may be configured not only to read the information recorded on the optical disc medium M but also to be capable of writing the information on the optical disc medium M. Further, the optical disc device 1 may also be configured to be capable of reading the information recorded on a plurality of types of the optical disc media M such as a CD, a DVD, and a Blu-ray disc.

The medium supporting portion 11 rotatably supports the optical disc medium M. The medium supporting portion 11 rotates the optical disc medium M by power transmitted from the spindle motor 12.

The optical pickup 13 irradiates the optical disc medium M with light, and detects reflected light of the irradiated light by the optical disc medium M to output an output signal according to the detected reflected light. The optical pickup 13 can be moved by the three-axis actuator 14 in two directions including a diameter direction of the optical disc medium M and a direction vertical to the surface of the optical disc medium M (specifically, direction along a rotation axis of the optical disc medium M). Further, the three-axis actuator 14 can change the relative tilt of the optical pickup 13 with respect to the optical disc medium M. The three-axis actuator 14 moves the optical pickup 13 in the direction vertical to the surface of the optical disc medium M to vary a distance from an objective lens 36 included in the optical pickup 13 to the surface of the optical disc medium M.

Figure 2:
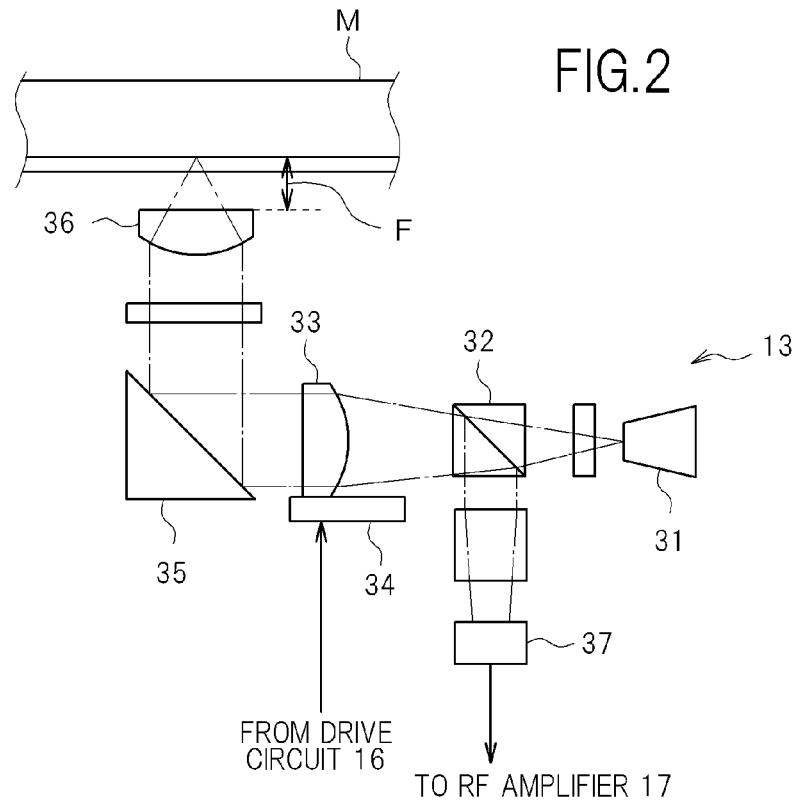
[FIG. 2] A schematic view illustrating an internal configuration example of an optical pickup of the optical disc device according to the embodiments of the present invention.

FIG. 2 is a view illustrating an internal configuration example of the optical pickup 13. In the example illustrated in FIG. 2, the optical pickup 13 includes a light-emitting element 31, a polarization beam splitter 32, a collimator lens 33, a collimator lens driving unit 34, an erecting mirror 35, the objective lens 36, and a photodetector 37.

The light-emitting element 31 is a semiconductor laser element for outputting a laser beam having a predetermined wavelength. The output light emitted from the light-emitting element 31 passes through the polarization beam splitter 32 and the collimator lens 33, and is then, reflected by the erecting mirror 35. Further, the output light reflected by the erecting mirror 35 is focused by the objective lens 36 on a focal position apart from the objective lens 36 by a focal length F to be reflected by the optical disc medium M.

After the reflected light by the optical disc medium M passes through the objective lens 36, the reflected light is reflected by the erecting mirror 35 to be guided by the polarization beam splitter 32 toward the photodetector 37. The photodetector 37 includes a plurality of light-receiving elements arranged in a matrix of, for example, N by N. When the reflected light guided by the polarization beam splitter 32 reaches the light-receiving elements, the photodetector 37 outputs a signal according to an intensity of the light received by each of the plurality of light-receiving elements as an output signal.

The collimator lens driving unit 34 includes an actuator and the like, and drives the collimator lens 33 forward and backward along an optical axis direction of the laser beam. The collimator lens driving unit 34 moves the collimator lens 33 along the optical axis direction to enable the correction of spherical aberration of the objective lens 36.

The feed motor 15 moves both the optical pickup 13 and the three-axis actuator 14 along the diameter direction of the optical disc medium M. By the driving of the feed motor 15, the optical pickup 13 can move from a position in the vicinity of the center of the optical disc medium M to the position in the vicinity of an outer periphery of the optical disc medium M.

The drive circuit 16 outputs driving signals for driving the collimator lens driving unit 34, the three-axis actuator 14, the spindle motor 12, and the feed motor 15 according to the control signal input from the servo signal processing unit 18. A rotation speed of the spindle motor 12 changes according to the driving signal from the drive circuit 16. As a result, a rotation speed of the optical disc medium M is controlled. Moreover, by the driving of the three-axis actuator 14 and the feed motor 15 according to the driving signals from the drive circuit 16, a distance of the objective lens 36 from the rotation axis of the optical disc medium M along the diameter direction and a distance from the objective lens 36 to the surface of the optical disc medium M are controlled.

The RF amplifier 17, the servo signal processing unit 18, the recorded signal processing unit 19, and the control unit 20 are realized by, for example, an A/D converter for converting the output signal from the optical pickup 13 into a digital signal, a digital signal processor (DSP) for processing the digital signal obtained by the conversion, and a microcomputer.

The RF amplifier 17 outputs various signals based on the respective output signals of the plurality of light-receiving elements, which are output from the optical pickup 13. Specifically, the RF amplifier 17 amplifies the output signal from each of the light-receiving elements with a given gain to output the obtained signal as an RF signal for data reproduction. The RF amplifier 17 also outputs a pull-in signal (PI signal) obtained by adding all the amplified output signals of the plurality of light-emitting elements. A level of the PI signal represents a total level of the output signals output from the optical pickup 13.

Moreover, the RF amplifier 17 calculates and outputs a focus error signal (FE signal) indicating a deviation of the focal position of the objective lens 36 with respect to the signal surface of the optical disc medium M. As an example, the FE signal is calculated by subtracting, from the sum of the output signals of the light-receiving elements arranged along a predetermined diagonal direction, the sum of the output signals of the light-receiving elements arranged along a diagonal direction crossing the predetermined diagonal direction in the plurality of light-receiving elements. Further, the RF amplifier 17 calculates and outputs a tracking error signal (TE signal) indicating a deviation in the diameter direction of the optical disc medium M between a position of a track in the data recording layer, on which the information is recorded, and the focal position of the objective lens 36.

The servo signal processing unit 18 generates various signals for servo control based on the PI signal, the FE signal, and the TE signal which are output from the RF amplifier 17, and outputs the generated signals to the control unit 20. The servo signal processing unit 18 outputs a control signal to the drive circuit 16 for driving the three-axis actuator 14, the collimator lens driving unit 34, the feed motor 15, and the spindle motor 12 according to an instruction input from the control unit 20.

Further, the servo signal processing unit 18 performs servo control according to an instruction from the control unit 20. Specifically, upon input of the instruction for starting the servo control from the control unit 20, the servo signal processing unit 18 outputs the control signal for controlling the three-axis actuator 14 according to the FE signal input from the RF amplifier 17 to perform focus servo control for the positional adjustment of the optical pickup 13 in a direction vertical to the surface of the optical disc medium M. As a result, the focus of the objective lens 36 is maintained on the signal surface of the optical disc medium M. Moreover, the servo signal processing unit 18 outputs the control signal for controlling the three-axis actuator 14 according to the TE signal input from the RF amplifier 17 to perform tracking servo control for changing the position of the optical pickup 13 in the diameter direction. As a result, the optical pickup 13 relatively moves with respect to the surface of the optical disc medium M to cause the focus of the objective lens 36 to follow the track in the data recording layer. In this manner, the relative position of the optical pickup 13 with respect to the surface of the optical disc medium M is controlled by the servo control performed by the servo signal processing unit 18. As a result, the state in which the optical pickup 13 can read the information from the optical disc medium M can be maintained, and the information is read in such a state. Note that, when a servo error occurs due to the effects of a disturbance or the like (specifically, the servo control can no longer be continued), the servo signal processing unit 18 outputs a signal for notifying the occurrence of the servo error to the control unit 20.

The recorded signal processing unit 19 demodulates a digital signal indicating the information recorded on the optical disc medium M based on the RF signal output from the RF amplifier 17, and outputs the demodulated digital signal to the control unit 20. The recorded signal processing unit 19 also calculates an evaluation value (such as RF amplitude or jitter value) for reading accuracy of the optical pickup 13 for the information recorded on the optical disc medium M, and outputs the calculated evaluation value to the control unit 20. Hereinafter, as a specific example, the recorded signal processing unit 19 measures the jitter value indicating a time deviation of rising timing of an RF signal waveform with respect to a reference clock, and outputs the measured jitter value to the control unit 20.

The control unit 20 is constituted by, for example, a microcomputer, and includes an execution module and a storage element. In the storage element of the control unit 20, a program to be executed and various parameters are stored. The execution module performs processing according to the program stored in the storage element. Specifically, the control unit 20 receives the input of signals from the servo signal processing unit 18 (such as signal for the result of peak detection of the PI signal and signal indicating the result of predetermined judgment performed on the FE signal), performs processing (focus detection processing) of detecting a position, at which the focus of the objective lens 36 is adjusted to be on the signal surface, based on the signals, and setting a distance between the optical pickup 13 and the optical disc medium M to be at the detected position. When the focus detection is performed by the focus detection processing, the control unit 20 outputs a command for starting the focus servo control to the servo signal processing unit 18 to maintain the state after the focus detection.

The control unit 20 is connected to a personal computer, a main body of a consumer game machine, a video decoder or the like, which serves as a host. In response to a request from the host, the control unit 20 outputs a command for driving the feed motor 15 or the three-axis actuator 14 to the servo signal processing unit 18 to move the focal position of the objective lens 36 (specifically, an information reading position on the optical disc medium M) to a desired position on the optical disc medium M. In addition to the operation described above, the control unit 20 outputs a command for changing a rotation speed of the spindle motor 12 to the servo signal processing unit 18 to adjust the rotation speed of the optical disc medium M. Then, in this state, the control unit 20 outputs the signal obtained by demodulating the signal read from the optical disc medium M, which is output from the recording signal processing unit 19, to the host side.

The thermistor 21 is disposed in the vicinity of the optical pickup 13, and functions as a measurement unit for measuring temperature inside the optical disc device 1. In this embodiment, the objective lens 36 of the optical pickup 13 is a plastic lens, and a lens characteristic thereof changes according to the temperature. Thus, the thermistor 21 measures ambient temperature of the optical pickup 13 and outputs a result of the measurement to the control unit 20 so as to perform correction according to the temperature characteristic of the objective lens 36.

In this embodiment, the optical disc device 1 performs initial adjustment processing of calculating desired set values (adjustment values) of predetermined control parameters which define an operation condition when a reading operation is performed to read information from the optical disc medium M. Specifically, in the initial adjustment processing, the optical disc device 1 calculates the adjustment values of the control parameters which are presumed to enable accurate reading of information recorded on the optical disc medium M. Then, the optical disc device 1 sets the adjustment value calculated through the initial adjustment processing for the control parameters, and executes the reading operation under the operation condition corresponding to the set values. By doing so, the optical disc device 1 can perform the reading of the information from the optical disc medium M with high accuracy without causing a reading error.

The initial adjustment processing for the control parameters is performed when, for example, the optical disc medium M is newly placed in the optical disc device 1 or the optical disc device 1 is powered ON. This is because the optimal set value of the control parameter varies depending on the type or the individual variability of the optical disc medium M.

Hereinbelow, description is given, as an example of the control parameters, of a case of adjusting a parameter regarding the position of the collimator lens 33 used to correct the spherical aberration of the objective lens 36 (SA parameter). When the set value of the SA parameter is changed, the optical disc device 1 controls the collimator lens driving unit 34 to cause the collimator lens 33 to move to a position corresponding to the set value. By appropriately adjusting the position of the collimator lens 33, the optical pickup 13 can correct the spherical aberration of the objective lens 36 so as to perform the reading of information with high accuracy.

Figure 3:
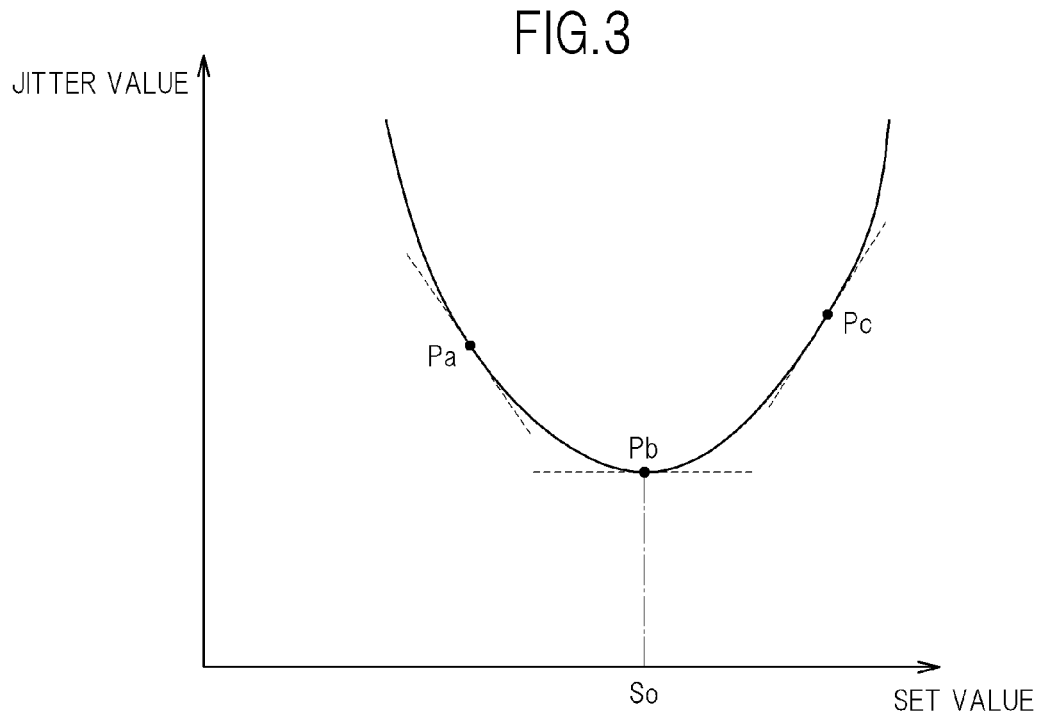
[FIG. 3] A graph showing an example of a relation between a set value of a control parameter and an evaluation value.

A specific example of the initial adjustment processing is now described. Between the set value of the control parameter and the evaluation value for reading accuracy (in this case, jitter value), there is established a relation which can be approximated by a quadratic curve. FIG. 3 is a graph showing an example of such a relation between the set value of the control parameter and the jitter value. In this figure, the horizontal axis (X-axis) indicates the set value of the control parameter, and the longitudinal axis (Y-axis) indicates the jitter value. In this example, the jitter value is used as the evaluation value, and hence as the value thereof is smaller, the reading accuracy is higher. In FIG. 3, the relation between the set value of the control parameter and the jitter value is represented by a concave upward parabola, and thus the set value of the control parameter which attains the highest reading accuracy (hereinbelow, referred to as optimal value So) is a value on the X-axis which corresponds to the vertex of the parabola. Accordingly, if a value on the X-axis which corresponds to a position in the vicinity of the vertex of the parabola is set as the set value of the control parameter, the evaluation value can be made smaller (that is, the accuracy of information reading can be improved).

In view of this, the optical disc device 1 measures, as sample data, the jitter values by respectively setting at least three or more different set values for the control parameter. Here, three or more pieces of the sample data are necessary because accurate approximation to a quadratic curve cannot be performed unless at least three points as exemplified in FIG. 3 are identified on the parabola. Those points are a point Pa at which the slope of the tangent line is negative, a point Pb at which the slope of the tangent line is almost 0, and a point Pc at which the slope of the tangent line is positive. After measuring the three or more pieces of the sample data, the optical disc device 1 calculates a quadratic curve, which is obtained by approximating those pieces of the sample data, by such a method as a least square method, and then calculates, as the adjustment value, the value of the predetermined control parameter which corresponds to the position of the vertex of the curve. After the initial adjustment processing is executed in this manner, the optical disc device 1 drives the collimator lens driving unit 34 based on the calculated adjustment value, thereby adjusting the position of the collimator lens 33.

Moreover, even after the adjustment value of the SA parameter is calculated through the initial adjustment processing described above, and the reading operation with respect to the optical disc medium M is started, the optical disc device 1 according to this embodiment corrects the set value of the SA parameter at a predetermined timing. If such correction of the SA parameter is not performed, as described above, the temperature inside the device increases over time, and the lens characteristic of the objective lens 36 is changed. Thus, there occurs a gap between the optimal value So of the SA parameter and the adjustment value set through the initial adjustment processing, which poses the fear of occurrence of a reading error.

Figure 4:
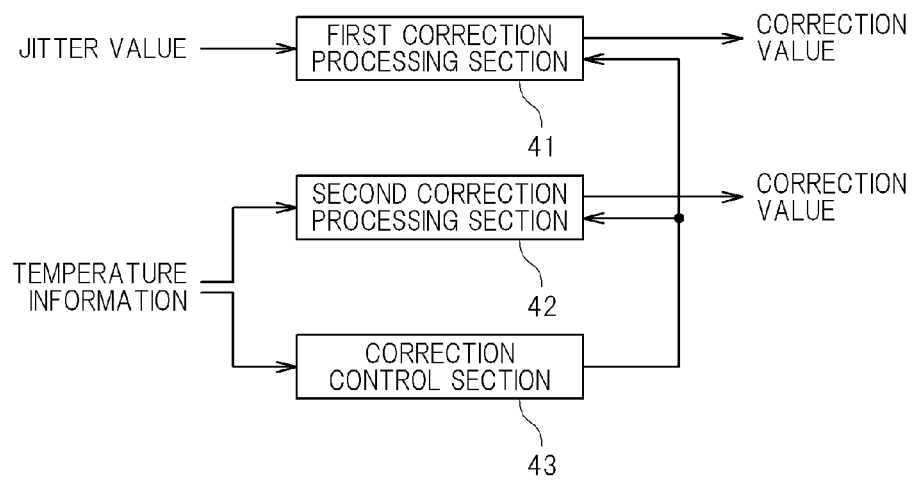
[FIG. 4] A functional block diagram illustrating an example of functions of an optical disc device according to a first embodiment of the present invention.

Hereinbelow, description is given of functions implemented by the optical disc device 1 according to this embodiment so as to execute the processing of correcting the SA parameter. As illustrated in FIG. 4, the optical disc device 1 functionally includes a first correction processing section 41, a second correction processing section 42, and a correction control section 43. Those functions are implemented by the control unit 20 executing the program stored in the built-in storage element. The program may be provided by being stored in various computer-readable information storage media. As described below in detail, the first correction processing section 41 and the second correction processing section 42 perform the processing of correcting the SA parameter by using different methods. The correction control section 43 determines which one of the correction processing sections executes the correction processing at which timing.

The first correction processing section 41 evaluates, for each of a plurality of different set values of the SA parameter, the accuracy of information reading from the optical disc medium M with the each of the set values thus set, to thereby correct the value of the SA parameter. Hereinbelow, the correction processing executed by the first correction processing section 41 is referred to as first correction processing. Specifically, by executing processing similar to the above-mentioned initial adjustment processing as the first correction processing, the first correction processing section 41 recalculates the optimal value So of the SA parameter, and then corrects the set value of the SA parameter based on the calculated optimal value So. With the first correction processing, regardless of individual variability or the like of the optical disc medium M, it is possible to set, as a correction value, a value substantially identical to the optimal value So obtained in a device environment at the time of execution of the correction processing.

The second correction processing section 42 corrects the value of the SA parameter based on the temperature measured by the thermistor 21 and a predetermined constant value. Hereinbelow, the correction processing executed by the second correction processing section 42 is referred to as second correction processing. A substantially-linear relation is established between the ambient temperature of the objective lens 36 and the optimal value So of the SA parameter. In view of this, the second correction processing section 42 calculates a value of the SA parameter to be set newly (hereinbelow, referred to as correction value S) by using, as references, the value of the SA parameter which has been set through the initial adjustment processing executed first or through the correction processing executed by the first correction processing section 41 most recently (hereinbelow, referred to as reference set value Sr), and the temperature measured by the thermistor 21 at the time of setting the reference set value Sr (hereinbelow, referred to as reference temperature Tr). Specifically, based on the reference set value Sr, the reference temperature Tr, a constant value A, and a current temperature T at the time of execution of the correction processing, the second correction processing section 42 calculates the correction value S by the following calculation formula.

$$S = A \cdot (T - Tr) + Sr$$

Note that, the second correction processing section 42 reads and uses, as the constant value A, a value stored in the device in advance.

As is apparent from the calculation formula given above, the constant value A corresponds to the slope of the linear relation between the temperature T and the correction value S. The constant value A is determined by, for example, the following method. That is, with regard to combinations of various optical disc media M and various optical disc devices 1, the temperature-dependent characteristics of the optimal values So of the SA parameter are measured to calculate the ratios of change (slopes) of the optimal values So with respect to temperature change. Then, an average value of the plurality of calculated slopes is determined as the constant value A used for the second correction processing, and is then stored in the storage element of the optical disc device 1. The constant value A in this case represents the ratio of change of the optimal value So with respect to temperature change for the combination of an average optical disc medium M and an average optical disc device 1.

Note that, the constant value A may be a different value for each type of the optical disc media M. In this case, the optical disc device 1 first executes processing of judging the type of the optical disc medium M set in the device, and, based on a result of the judgment, selects the constant value A to be used for the second correction processing from among a plurality of candidate values stored in advance. Further, in the case of an optical disc medium M including a plurality of data recording layers, a different constant value A may be prepared for each of the plurality of data recording layers.

The correction control section 43 performs such control that selectively causes any one of the first correction processing section 41 and the second correction processing section 42 to execute the processing of correcting the value of the predetermined control parameter, at every predetermined timing after the reading of information from the optical disc medium M is started. Here, specifically, according to change in the temperature measured by the thermistor 21, the correction control section 43 determines a timing of executing the correction processing, and which one of the first correction processing and the second correction processing is to be executed at that timing.

In order to calculate the adjustment value of the SA parameter through the processing similar to the initial adjustment processing, as described above, it is necessary to measure the jitter values which correspond to the respective three or more set values while changing the set value of the SA parameter. On this occasion, in response to the change of the set value of the SA parameter, there is performed mechanical control of changing the position of the collimator lens 33 a plurality of times. For this reason, the first correction processing takes more time compared to the second correction processing. Instead, with the first correction processing, regardless of individual variability or the like of the optical disc medium M and the optical disc device 1, it is possible to calculate an optimal adjustment value in the device environment at the time of executing the correction processing. On the other hand, the second correction processing allows the correction value S to be determined through computation processing without changing the position of the collimator lens 33 many times, and thus can be completed in a shorter period of time compared to the first correction processing. However, the constant value A used for the second correction processing is such a value that is determined based on the combination of the average optical disc medium M and the average optical disc device 1. Hence, with the second correction processing, an optimal correction value S is not always obtained for the individual optical disc medium M and optical disc device 1.

To address this, the correction control section 43 is configured to cause the second correction processing section 42 to execute the correction processing while the temperature change since the execution of the initial adjustment processing is small, and to cause the first correction processing section 41 to execute the correction processing when the temperature change has become large to some extent. In other words, the optical disc device 1 corrects the SA parameter through the second correction processing, which is simple, while the temperature change is small, and, before such simple correction processing becomes unable to absorb a gap between the correction value S and the optimal value So, executes the first correction processing, which is more accurate. With this configuration, while suppressing a period of time required for the correction processing compared to the case of frequently executing the first correction processing, the optical disc device 1 can keep correcting the SA parameter without occurrence of a reading error while the device is kept being used.

To give a specific example, the correction control section 43 periodically acquires information on the temperature T measured by the thermistor 21, and performs the control which causes any one of the first correction processing and the second correction processing to be executed, every time the temperature T is changed by a predetermined amount (in this case, 5° C.) from that at the time of executing the initial adjustment processing or the previous correction processing. On this occasion, it is assumed that after the initial adjustment processing or the first correction processing is executed, the second correction processing is executed three times, and the first correction processing is executed for a fourth time. Specifically, after the execution of the initial adjustment processing, the correction processing is executed every time the temperature has increased by 5° C., and the first correction processing is executed every fourth time (when the temperature has increased by 20° C.).

Figure 5:
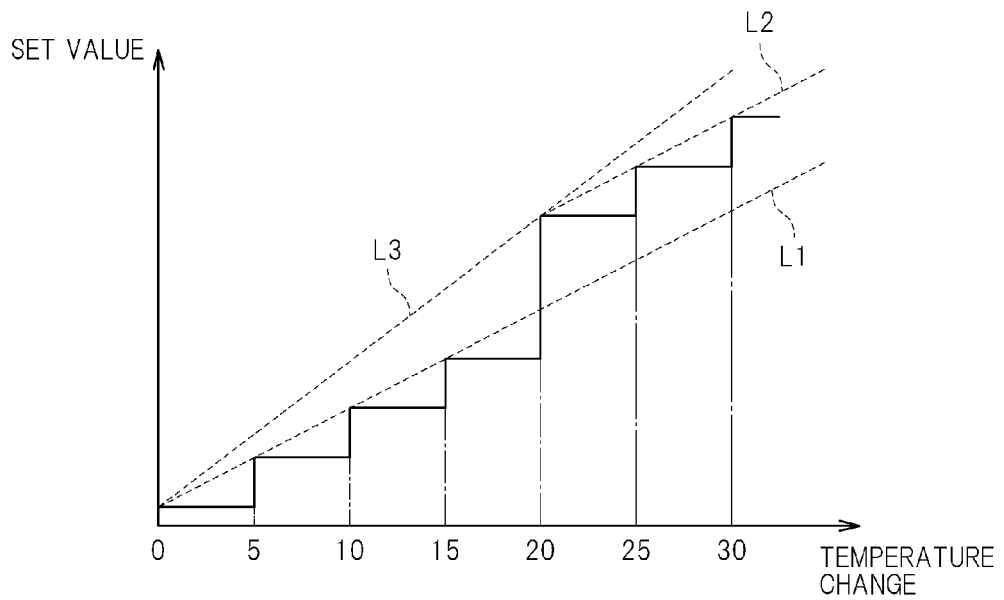
[FIG. 5] A graph showing an example of a relation between temperature change and the set value of the control parameter.

FIG. 5 is a graph showing a relation between the temperature change and the set value of the SA parameter obtained when the correction control section 43 executes such control. The horizontal axis of the graph indicates the temperature change with respect to the temperature at the time of executing the initial adjustment processing, and "0" corresponds to the execution timing of the initial adjustment processing. Further, the longitudinal axis of the graph indicates the set value of the SA parameter, and the solid line in the graph shows an example of the change of the set value of the SA parameter which is made by the control described above. Further, each of dashed straight lines L1 and L2 in the figure shows a linear relation between the temperature change and the optimal value So of the SA parameter, the slope of which is the constant value A stored in advance in the optical disc device 1. The straight lines L1 and L2 use, as references, the set value obtained after the execution of the initial adjustment processing and the set value obtained after the first execution of the first correction processing, respectively. On the other hand, a straight line L3 shows a relation between actual temperature change and the optimal value So of the SA parameter for a combination of the device and the medium shown in FIG. 5.

As shown in the figure, the optical disc device 1 corrects the set value of the SA parameter through the first correction processing or the second correction processing every time the temperature inside the device increases by 5° C. In this case, the correction processing is executed by the second correction processing section 42 for the first three times. As a result, the set values after the correction coincide with points on the straight line L1. As can be seen from the graph, every time the second correction processing is executed, the set value is brought closer to the actual optimal value So of the SA parameter indicated by the straight line L3, but the gap between the set value and the optimal value So becomes larger as the temperature increases. After that, when the temperature has increased by 20° C., the first correction processing is executed. With the first correction processing, the set value is corrected so as to coincide with the optimal value So on the straight line L3. After that, the second correction processing is executed again every time the temperature increases by 5° C., thereby correcting the set value along the straight line L2.

Note that, in FIG. 5, after the first correction processing is executed, the second correction processing is executed by using the constant value A stored in advance in the device as well. However, the optical disc device 1 may calculate the slope of the linear relation between the actual temperature change and the optimal value So of the SA parameter (slope of the straight line L3 of FIG. 5) by using the adjustment value of the SA parameter obtained as a result of the initial adjustment processing and the first correction processing, and may use the calculated value as a new constant value A, to thereby execute the subsequent second correction processing. Further, if the constant value A is newly determined with high accuracy in this manner, conceivably, the SA parameter can be corrected to a value close to the optimal value So with high accuracy through the subsequent second correction processing. Thus, the execution of the first correction processing may be restricted thereafter, and the SA parameter may be corrected through the second correction processing. Alternatively, while decreasing the execution frequency of the first correction processing, the execution frequency of the second correction processing may be increased.

Further, the respective execution frequencies of the first correction processing and the second correction processing may be changed according to the type of the optical disc medium M. For example, particular types of the optical disc medium M, such as a BD-R of low to high (LTH) type, exhibit a wide range of variation in the constant value A due to the individual variability thereof. Accordingly, when the optical disc medium M of such type is set, the execution frequency of the first correction processing may be increased compared to that of other types of the optical disc medium M (for example, the first correction processing is executed every time the temperature increases by 15° C.).

Further, the correction control section 43 may determine the timing of causing the first correction processing section 41 or the second correction processing section 42 to execute the correction processing not only according to the change in the temperature measured by the thermistor 21 but also according to a control timing of the reading operation of the device. Specifically, for example, if the correction processing is executed while the reading of information from the optical disc medium M is being performed in response to a command from the host, the reading operation is suspended, which results in a longer waiting time of reading than normal from the perspective of the host. Hence, the correction control section 43 may cause the first correction processing or the second correction processing to be executed at a timing at which a predetermined condition regarding the reading operation is satisfied for the first time after a predetermined temperature change (in the above-mentioned example, a temperature increase of 5° C. after the previous correction).

Specifically, after the predetermined temperature change, the correction control section 43 may execute the correction processing at a timing at which a predetermined control operation is executed for the first time. To give an example, in order to read information from a specified position in response to an information reading command from the host, the optical disc device 1 drives the three-axis actuator 14, thereby performing seek control of moving the optical pickup 13 along the diameter direction of the optical disc medium M. Thus, the correction control section 43 may cause the first correction processing or the second correction processing to be executed at a timing at which the seek control is started or finished.

Further, when the information reading command is received from the host, there is a case where the optical disc device 1 pre-reads information recorded in a range which follows the range specified by the command, and stores the information in a cache memory in preparation for a next information reading command. In such a case, the correction control section 43 may start the execution of the first correction processing or the second correction processing when a predetermined amount of data or more is cached in the cache memory. With this configuration, when the information reading command is newly received from the host, there is an increased possibility of being able to provide information stored in the cache memory without performing the information reading operation again. Hence, it is possible to prevent the waiting time of the reading operation from increasing due to the correction processing.

However, depending on the content of a command from the host, such predetermined conditions regarding the reading operation that have been given above as examples may be difficult to be satisfied. For example, when the reading operation is executed for a large amount of data stored successively in the optical disc medium M, the conditions described above are not satisfied during the execution of the reading operation. However, in this case, too, there occurs a fear that the temperature is increased to cause the set value of the control parameter to deviate from the optimal value So. To address this, when the predetermined condition regarding the reading operation is not satisfied for a fixed period of time after the predetermined temperature change, the correction control section 43 may forcefully execute the first correction processing or the second correction processing. Further, depending on whether the correction processing to be executed next is the first correction processing or the second correction processing, the correction control section 43 may change the predetermined condition for determining the execution timing thereof.

According to the optical disc device 1 of the first embodiment described above, compared to the case of repeatedly executing only the first correction processing, it is possible to correct the control parameter in a short period of time while the device is being used.

[Second Embodiment]

Next, an optical disc device according to a second embodiment of the present invention is described. Note that, a hardware configuration of the optical disc device according to the second embodiment is the same as the hardware configuration of the optical disc device illustrated in FIGS. 1 and 2 according to the first embodiment. Hence, detailed description thereof is herein omitted, and the same components as those of the first embodiment are denoted by the same reference symbols.

Similarly to the optical disc device according to the first embodiment, after starting the reading of information with respect to the optical disc medium M, the optical disc device according to this embodiment corrects the set value so that the set value follows the optimal value So of the control parameter (in this case, SA parameter) which fluctuates with change in device environment. However, in this embodiment, the processing of correcting the control parameter is executed by a method different from that of the first embodiment. Note that, hereinbelow, for the sake of convenience, correction processing performed in the second embodiment is referred to as third correction processing so as to be distinguished from the first correction processing and the second correction processing performed in the first embodiment.

Specifically, the optical disc device 1 executes processing of acquiring, with regard to two values of the control parameter, evaluation values indicating accuracy of information reading from the optical disc medium M (in this case, jitter values), and updating the set value of the control parameter based on the acquired two evaluation values. Through the update processing, the set value of the control parameter is changed to be closer to the optimal value So. By repeatedly executing such processing, the optical disc device 1 corrects the set value of the control parameter to a value close to the optimal value So. The correction processing may be executed while the operation of reading information from the optical disc medium M is being performed. Note that, the correction processing is implemented by the control unit 20 executing the program stored in the built-in storage element. The program may be provided by being stored in various computer-readable information storage media.

The basic idea of the third correction processing is now described. The optical disc device 1 sets, as a reference, the value of the SA parameter obtained when the processing of updating the set value is to be executed (hereinbelow, referred to as central value Sc), and then measures the jitter values which correspond to two different set values shifted to both sides by the same amount from the central value Sc as the center (hereinbelow, referred to as added value Sp and subtracted value Sm, respectively). Here, with the use of a predetermined change amount α, the added value Sp and the subtracted value Sm are respectively expressed as follows:

$$Sp=Sc+\alpha; \text{ and}$$

$$Sm=Sc-\alpha.$$

Provided that the jitter value obtained when the set value is set to S is expressed by J(S), as illustrated in FIG. 3, between the set value S of the SA parameter and the jitter value J(S), there is established a relation which can be approximated to a concave upward parabola. Accordingly, assuming that the jitter values measured with regard to the added value Sp and the subtracted value Sm, respectively, conform with an ideal parabola, it is possible to judge whether the central value Sc is larger or smaller than the optimal value So by making a comparison regarding which one of the jitter values J(Sp) and J(Sm) is larger. Specifically, when J(Sm)<J(Sp) is established, it is estimated that Sc>So. Then, the control unit 20 judges that the central value Sc needs to be updated to a smaller value. Conversely, when J(Sm)>J(Sp) is established, it is estimated that Sc<So, and it is then judged that the central value Sc needs to be updated to a larger value. By repeatedly performing the processing of updating the central value Sc as described above, the central value Sc is brought closer to the optimal value So. Even when the optimal value So is changed due to, for example, temperature increase while the device is being used, it is possible to prevent the central value Sc from significantly deviating from the optimal value So by repeating the update processing with some extent of frequency.

Note that, when the optical disc device 1 according to this embodiment executes the third correction processing, the change amount α needs to be set to a small value so that the reading accuracy is not significantly affected. In the above-mentioned initial adjustment processing, in order to perform approximation to a parabola with high accuracy, the set value needs to be changed in a large range to some extent. However, the third correction processing is executed while the operation of reading information from the optical disc medium M is being performed, and hence if the set value is changed significantly as in the case of the initial adjustment processing, the fear of occurrence of a reading error or a servo control error becomes higher. Thus, by setting the change amount α smaller than the change amount of the set value used in the initial adjustment processing, it is possible to avoid such a problem.

Specifically, the change amount α may be a predetermined amount, but also may be determined based on a coefficient representing the relation between the set value and the evaluation value, which is determined by approximation calculation in the initial adjustment processing for the SA parameter. With this configuration, for example, when the range in which the set value of the SA parameter can be changed is narrow, by setting the change amount α smaller, it is possible to reduce the probability of occurrence of a reading error during the correction processing.

Hereinbelow, a specific example of the third correction processing executed by the control unit 20 is described with reference to flow charts of FIGS. 6 to 10. Note that, for example, after the seek control is executed in response to the information reading command from the host, the optical disc device 1 starts the third correction processing at a timing at which the reading of information is started. With this, the optical disc device 1 executes the third correction processing in parallel to the reading of information from the optical disc medium M. Further, the third correction processing may be executed when such an information reading command has not been received for a given period of time or longer, and control of maintaining the current position of the optical pickup (pause control) is being executed. The third correction processing is repeatedly executed until a new command is received from the host after, for example, the reading operation is finished.

Figure 6:
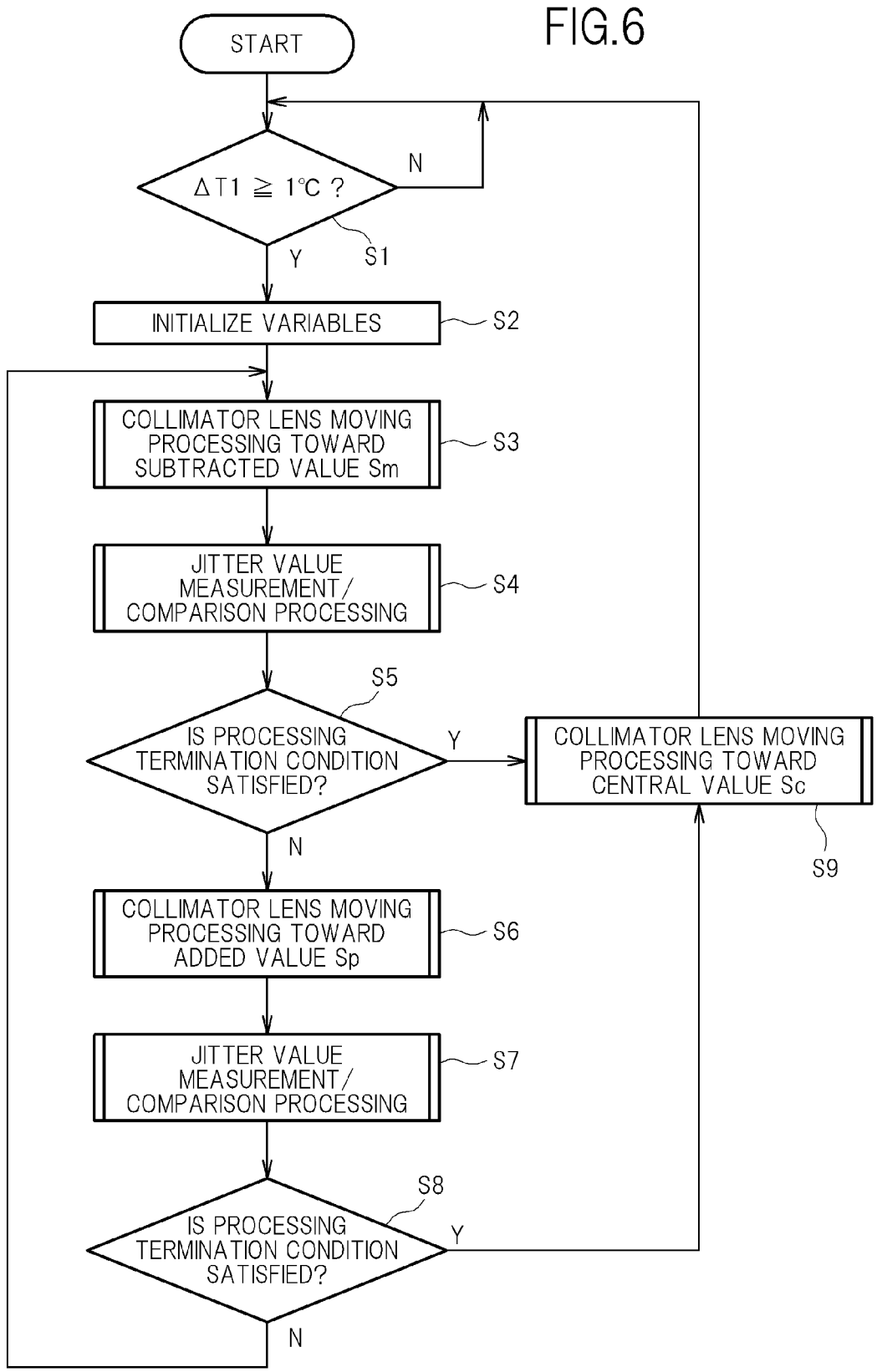
[FIG. 6] A flow chart illustrating an example of a flow of correction processing executed by an optical disc device according to a second embodiment of the present invention.

As illustrated in FIG. 6, the control unit 20 first judges whether or not a difference ΔT1 between a reference temperature Tr1 and a current temperature T is equal to or larger than a predetermined value (in this case, 1° C.) (S1). Here, at the time of start of the third correction processing, similarly to the first embodiment, the reference temperature Tr1 is a temperature measured by the thermistor 21 when the initial adjustment processing is executed first. Further, the current temperature T is a temperature measured by the thermistor 21 when the judgment is performed. When ΔT1 is smaller than the predetermined value, subsequent processing is not executed. When the temperature difference has become equal to or larger than the predetermined value, the subsequent processing is started.

Subsequently, the control unit 20 initializes variables (S2). Specifically, the control unit 20 sets information of a current time t to each of variables t1 and t2 which indicate a start time of a timer. Further, the control unit 20 resets, to 0, all values of array variables Jp[y] and Jm[y] for storing results of measuring the jitter values. Here, y is a counter variable which takes an integer from 0 to N, and (N+1) values are stored at a maximum as each of the array variables Jp and Jm. Further, the control unit 20 assigns 0 to a variable Ser, which stores an integrated value for determining the update direction of the SA parameter (whether the central value Sc is to be increased or decreased), assigns a predetermined initial value (in this case, 7 seconds) to a time variable ta, which defines the driving interval of the collimator lens 33, and assigns 0 to a variable Dirc, which indicates the previous update direction of the SA parameter.

Figure 7:
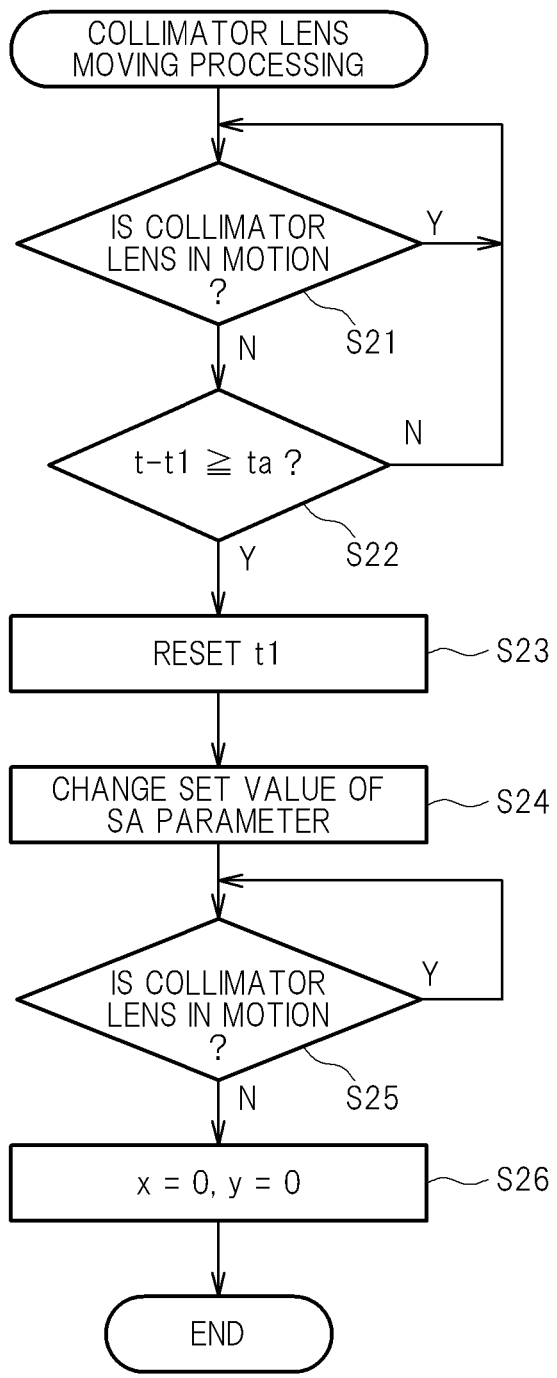
[FIG. 7] A flow chart illustrating an example of a flow of collimator lens moving processing.

Subsequently, the control unit 20 changes the set value of the SA parameter to the subtracted value Sm (=Sc−α), and performs collimator lens moving processing of moving the collimator lens 33 up to a position corresponding to the subtracted value Sm (S3). Specifically, this processing is as illustrated in FIG. 7.

That is, the control unit 20 first checks whether or not the collimator lens 33 is in motion due to other control processing (S21). This processing is executed so as to guarantee that, when the third correction processing of this embodiment is executed in parallel to other processing, the collimator lens 33 is not being driven unexpectedly. When the collimator lens 33 is in motion, the control unit 20 waits for the movement to be finished.

Subsequently, the control unit 20 judges whether or not the current time t satisfies t−t1≥ta (S22). This judgment is performed so that the collimator lens 33 is driven to change its position with a time interval equal to or longer than a time period indicated by the time variable ta. With this configuration, it is possible to suppress heat generation or mechanical load which is caused by the collimator lens 33 being moved with a short time interval. When this judgment condition is not satisfied, the control unit 20 returns to S21, and waits for a time period equal to or longer than ta to elapse.

When the judgment condition of S22 is satisfied, the control unit 20 resets the variable t1 to the current time t (S23), and changes the set value of the SA parameter to the subtracted value Sm, which is smaller by the change amount a than the central value Sc at the current time (S24). In response to this change, the collimator lens driving unit 34 drives the collimator lens 33.

After that, the control unit 20 waits for the movement of the collimator lens 33 to be completed (S25). When the movement of the collimator lens 33 is completed, the control unit 20 resets two counter variables x and y to 0 for subsequent jitter value measurement/comparison processing (S26), and terminates the collimator lens moving processing.

Referring back to FIG. 6, subsequently, the control unit 20 performs the jitter value measurement/comparison processing of measuring the jitter value a plurality of times under a state in which the collimator lens 33 has moved to the position corresponding to the subtracted value Sm, and comparing the resultant values to the jitter values obtained at the position corresponding to the added value Sp (S4). Note that, when the third correction processing is executed in parallel to the reading of information, there is no need to perform the reading of information again only for the measurement of the jitter value at the time of measuring the jitter value in the jitter value measurement/comparison processing. The jitter value may be calculated based on a reproduction signal (RF signal) obtained through the information reading operation carried out in parallel.

Figure 8:
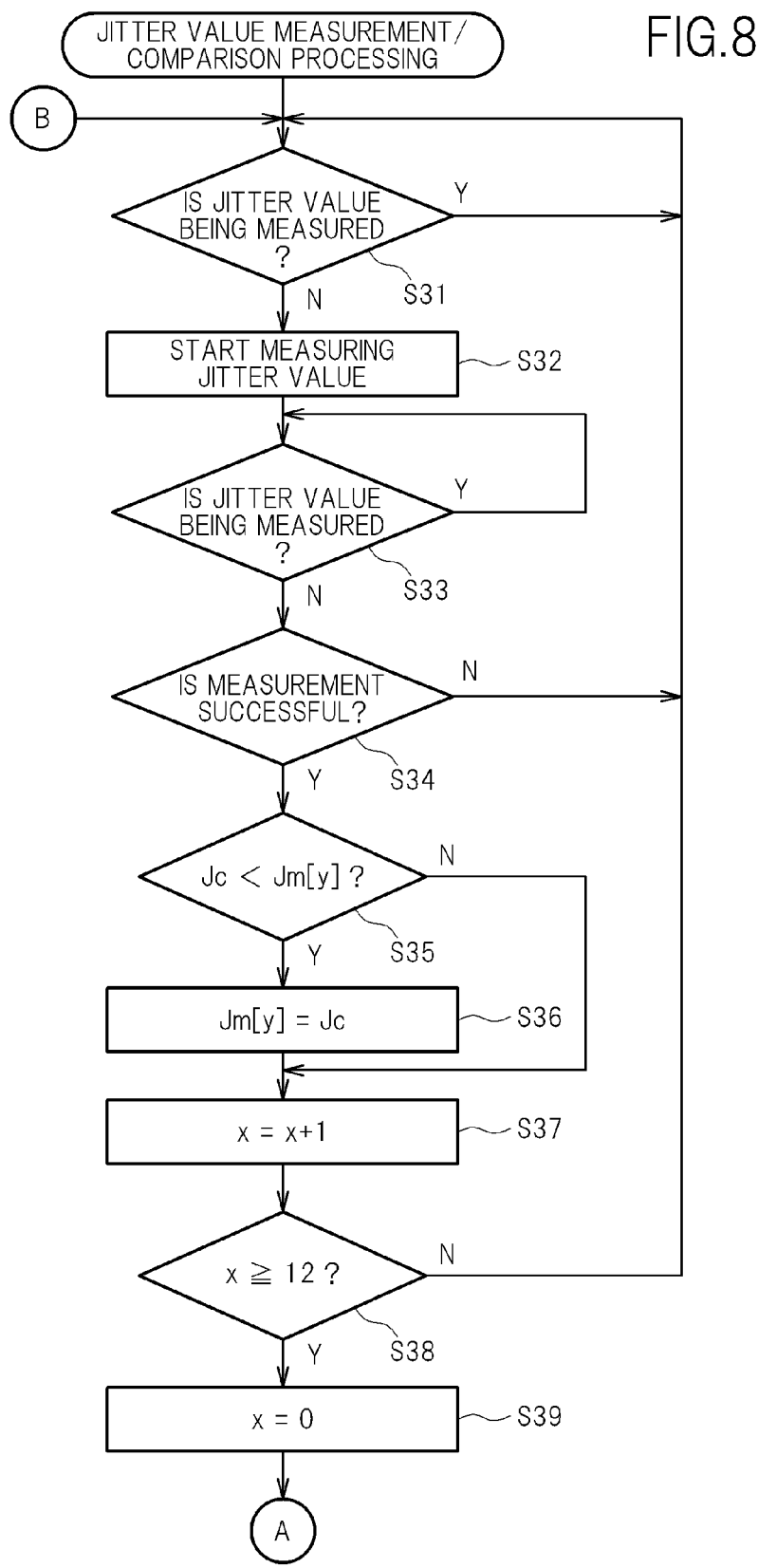
[FIG. 8] A flow chart illustrating an example of a flow of jitter value measurement/comparison processing.
Figure 9:
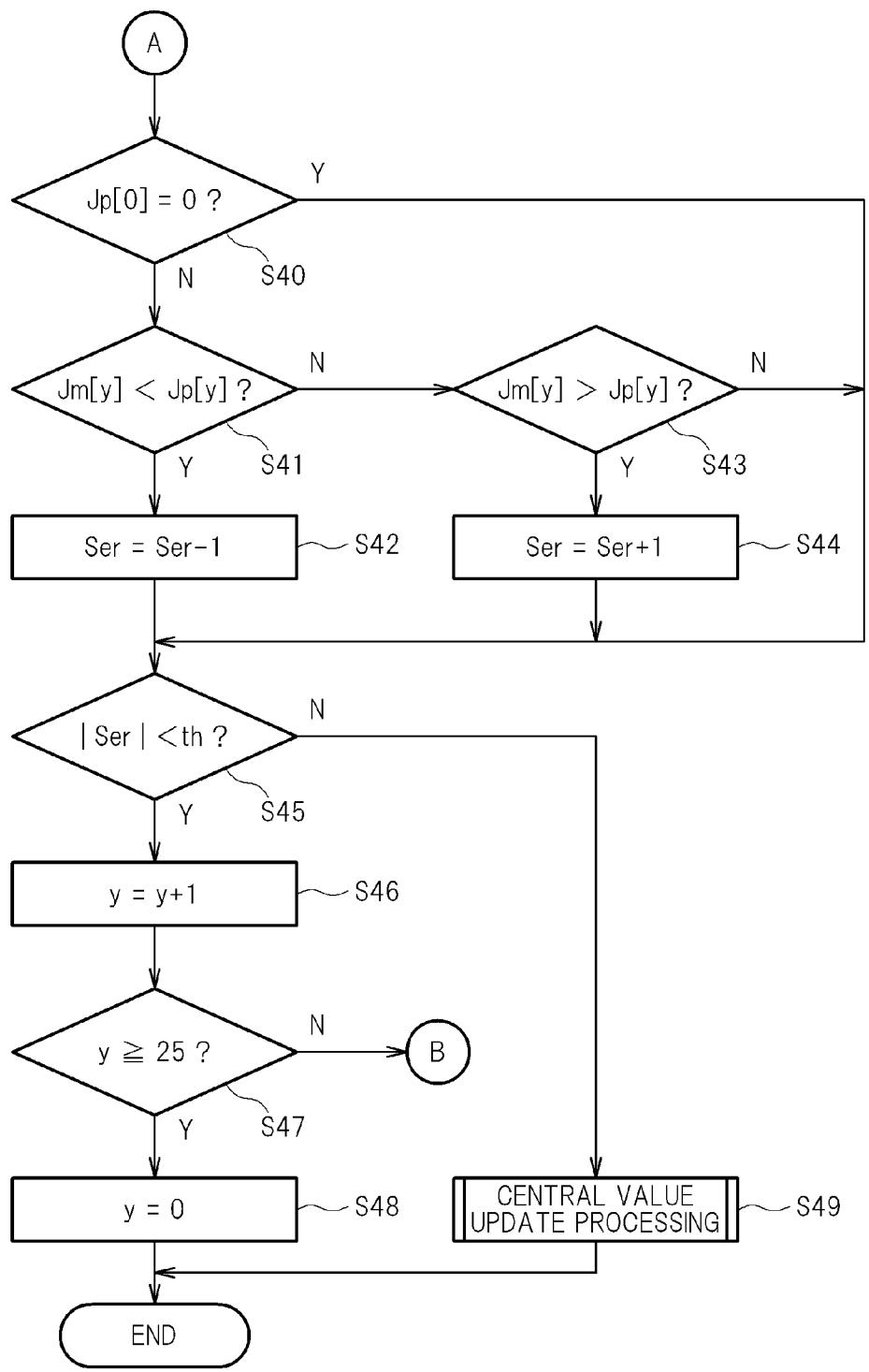
[FIG. 9] A flow chart illustrating the example of the flow of the jitter value measurement/comparison processing.

A specific example of the jitter value measurement/comparison processing is described with reference to the flow charts of FIGS. 8 and 9. First, the control unit 20 checks whether or not the jitter value is being measured in other control processing (S31). When the jitter value is being measured, the control unit 20 waits for the measurement to be finished, and then executes subsequent processing.

Subsequently, the control unit 20 instructs the recorded signal processing unit 19 to start measuring the jitter value (S32), and waits for the measurement of the jitter value corresponding to the instruction to be completed (S33). When the measurement of the jitter value is completed, the control unit 20 judges whether or not the measurement is successful (S34). When the measurement is unsuccessful, the control unit 20 returns to S31 and tries a measurement again. On the other hand, when the measurement is successful, the control unit 20 judges whether or not a measured jitter value Jc is smaller than the jitter value already stored in Jm[y] (S35). When the newly-measured jitter value Jc is smaller than the already-stored jitter value, the value of Jm[y] is overwritten with the newly-measured jitter value Jc (S36). Note that, when Jm[y]=0 in S35 (that is, when Jm[y] is not assigned with an actually-measured jitter value yet), the control unit 20 assigns the currently-measured jitter value Jc to Jm[y].

Further, the control unit 20 adds 1 to the counter variable x (S37), and then judges whether or not a condition requiring x to be equal to or larger than a predetermined value (in this case, 12) is satisfied (S38). When this judgment condition is not satisfied, the control unit 20 returns to S31 to repeat the measurement of a new jitter value. On the other hand, when the judgment condition is satisfied, x is reset to 0 (S39).

Through the processing performed so far, the jitter value is measured a plurality of times (in this case, 12 times) with the subtracted value Sm set, and the smallest value of a plurality of resultant measured values is stored in the variable Jm[y].

Here, the measurement is performed a plurality of times, and the smallest value is acquired therefrom so that, for example, when an extraordinarily large jitter value has been measured due to a scratch on the optical disc medium M or the like, the subsequent processing is prevented from being executed based on such an abnormal value.

After that, the control unit 20 judges whether or not Jp[0] is 0 (S40). When Jp[0] is 0, the jitter value corresponding to the added value Sp (=Sc+α) has not been measured yet, which means that there exists no data to be compared to Jm[y] obtained through the processing described above. In this case, a comparison between Jp[y] and Jm[y] is not performed, and the control unit 20 proceeds to processing of S45. Note that, after the third correction processing is started, when the judgment is performed for the first time, Jp[0] is supposed to be always 0.

On the other hand, when Jp[0] is not 0, this means that the jitter value measurement/comparison processing (processing of S7 described later) with the added value Sp set has already been performed, and, as the measurement results, 25 jitter values are stored in the array variable Jp. In this case, the control unit 20 compares, in terms of magnitude, the jitter value stored in Jm[y] through the above-mentioned processing and the jitter value stored in Jp [y], to thereby judge whether or not Jm[y]<Jp[y] is established (S41). When this inequality is established, the control unit 20 subtracts 1 from a value stored in the variable Ser (S42). On the other hand, when the inequality is not established, the control unit 20 judges whether or not Jm[y]>Jp[y] is conversely established (S43). When this inequality is established, the control unit 20 adds 1 to the value stored in the variable Ser (S44). When the inequality is not established, this means that Jm[y] is equal to Jp[y], and hence the control unit 20 proceeds to the next processing of S45 without updating the value of the variable Ser.

Subsequently, the control unit 20 judges whether or not an absolute value |Ser| of the value stored in the variable Ser is smaller than a predetermined threshold th (in this case, 15) (S45). When |Ser|<th, the control unit 20 adds 1 to y (S46), and then judges whether or not y is equal to or larger than a predetermined value (in this case, 25) (S47). When y is equal to or larger than 25, the control unit 20 resets y to 0 (S48), and terminates the jitter value measurement processing. On the other hand, when y is smaller than 25, the control unit 20 returns to S31, and repeats the processing described above with regard to a new value of y.

As described above, by repeating, 25 times, the processing of measuring the jitter value a plurality of times and storing the smallest value thereof in Jm[y] (S31 to S39) while incrementing y, the jitter value is stored in order in the array variable Jm[y] with regard to each value of y ranging from 0 to 24. Then, when the jitter value is already stored in Jp[y], a comparison is made in terms of magnitude between Jm[y] and Jp[y] in S41 and S43 every time the jitter value is stored in Jm[y] with regard to a new value of y, and, based on the comparison result, the comparison result is accumulated in the variable Ser in S42 and S44. Here, when the relation of J(Sm)<J(Sp) is established between the jitter value J(Sm) corresponding to the subtracted value Sm and the jitter value J(Sp) corresponding to the added value Sp, conceivably, as a result of repeating the processing (S42) of subtracting 1 from the value of the variable Ser, |Ser|=th is established before the repetitive processing with regard to y is performed 25 times, with the result that the judgment condition of S45 fails to be satisfied. Similarly, also when the relation of J(Sm)>J(Sp) is established, conceivably, the processing (S44) of adding 1 to the value of the variable Ser is repeated to establish |Ser|=th as well, with the result that the judgment condition of S45 fails to be satisfied. On the other hand, y is incremented up to 25 with the judgment condition of S45 kept satisfied, for example, when the processing of from S41 to S44 is skipped because the jitter value has not been stored in Jp[y] yet or when there is almost no difference between J(Sm) and J(Sp) (that is, when the central value Sc substantially coincides with the optimal value So).

Here, a plurality of the jitter values are measured as Jm[y] and Jp[y], and the results obtained through comparisons thereof in terms of magnitude are then accumulated as the value of the variable Ser. This is to prevent the magnitude relation between J(Sm) and J(Sp) from being judged erroneously due to an abnormal jitter value. As described above, the third correction processing is performed also while the reading of information from the optical disc medium M is being performed. Accordingly, in some cases, even when the correction processing is being performed, the correction processing is suspended due to the seek control, and two jitter values of comparison targets are measured at different locations on the optical disc medium M. However, if the measurement locations are different, there occurs a fear that the magnitude relation between J(Sm) and J(Sp) cannot be properly evaluated due to an influence caused by, for example, a scratch on the medium surface. To address this, in this embodiment, 25 jitter values corresponding to J(Sm) and 25 jitter values corresponding to J(Sp) are respectively acquired at a maximum, and the magnitude relation between J(Sm) and J(Sp) is evaluated by statistically evaluating an overall tendency thereof.

As described above, the judgment condition of S45 fails to be satisfied when the magnitude relation between J(Sm) and J(Sp) is statistically evaluated, and a result of the evaluation is obtained. In this case, the control unit 20 executes central value update processing (S49) described below, to thereby update the central value Sc to a value close to the optimal value So.

Figure 10:
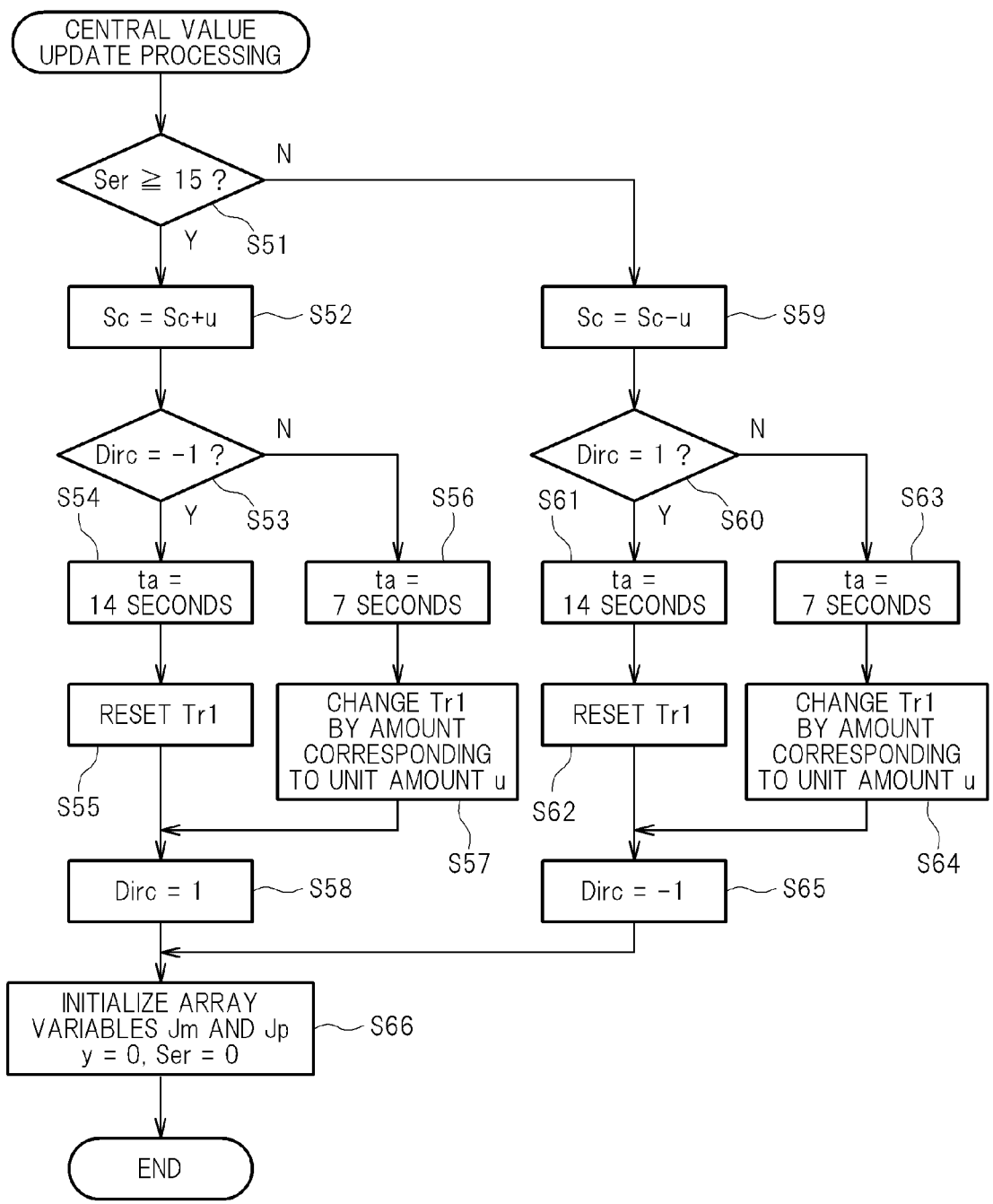
[FIG. 10] A flow chart illustrating an example of a flow of central value update processing.

FIG. 10 is a flow chart illustrating a flow of the central value update processing. As illustrated in the figure, the control unit 20 first judges whether or not Ser is equal to or larger than 15 (S51). When Ser is equal to or larger than 15, it can be evaluated that the relation of J(Sm)>J(Sp) is established, and hence the control unit 20 increases the central value Sc by a predetermined unit amount u (for example, corresponding to a minimum unit amount of movement of the collimator lens 33) (S52).

Subsequently, the control unit 20 judges whether or not the variable Dirc is −1 (S53). When the current value of Dirc is −1, this means that because the update of decreasing the central value Sc was performed in the previous central value update processing, in the central value update processing this time, the central value Sc has been changed in a reverse direction from the previous processing. In this case, it is presumed that the central value Sc has been brought substantially to the optimal value So corresponding to the vertex of the parabola, and hence the update frequency of the SA parameter after that is decreased. Specifically, the control unit 20 changes the value of the time variable ta to a value larger than the initial value (in this case, 14 seconds) (S54). With this configuration, the waiting time which occurs in S22 of the above-mentioned collimator lens moving processing becomes longer than the initial value, and the frequency of moving the collimator lens 33 becomes lower. That is, the update cycle of the SA parameter becomes longer. Further, the control unit 20 resets the reference temperature Tr1 to the temperature T at the current time measured by the thermistor 21 (S55). This is for judging whether or not a processing termination condition described later is satisfied with the time of updating the central value Sc as a reference.

On the other hand, when it is judged in S53 that Dirc is not −1, the update direction of the central value Sc is not changed, and hence the update frequency of the SA parameter is returned to an initial setting state. Specifically, the control unit 20 changes the value of the time variable ta to the initial value (7 seconds) (S56). Further, in this case, the central value Sc is conceivably in the course of approaching the optimal value So, and thus the reference temperature Tr1 cannot be reset yet. However, in response to the central value Sc having been brought closer to the optimal value So by the unit amount u in S52, the reference temperature Tr1 is changed by an amount corresponding to the unit amount u. Specifically, the temperature change corresponding to the unit amount u is expressed by u/A by using the constant value A described in the example of the first embodiment. The control unit 20 adds this value to the reference temperature Tr1. After the processing of any one of S55 and S57 is executed, the control unit 20 further updates the value of the variable Dirc to 1 according to the direction in which the central value Sc has been corrected this time.

Further, when the above-mentioned judgment condition of S51 is not satisfied (that is, when Ser is not a positive value), this means that Ser is a negative value (equal to or smaller than −15), and hence it can be evaluated that the relation of J(Sm) <J(Sp) is conversely established. In this case, the control unit 20 decreases the central value Sc by the predetermined unit amount u (S59).

Subsequently, as illustrated from S60 to S65 in FIG. 10, the control unit 20 executes similar processing as that from S53 to S58 performed when Ser≥15. However, considering that the direction of changing the central value Sc in S59 is opposite to that in S52, the processing is respectively different from the processing of S53, S57, and S58 in that: it is judged in S60 whether or not Dirc is 1; u/A is subtracted from the reference temperature Tr1 in S64 instead of adding u/A to the reference temperature Tr1; and Dirc is updated to −1 in S65.

Lastly, in response to the update of the central value Sc, the control unit 20 resets each variable used for storing and comparing the jitter values in the jitter value measurement/comparison processing. Specifically, the control unit 20 initializes all the values of the array variables Jm[y] and Jp[y] to 0, and also assigns 0 to each of the variables y and Ser (S66), thereby terminating the central value update processing. With this, the jitter value measurement/comparison processing is also terminated.

Referring back to FIG. 6, after the jitter value measurement/comparison processing is terminated, the control unit 20 subsequently judges whether or not the processing termination condition is satisfied (S5). Here, when the update of the central value Sc is alternately executed in different directions instead of the update of the central value Sc being repeated in the same direction in the central value update processing as described above, it is presumed that the central value Sc substantially coincides with the optimal value So. When such a state has lasted for a certain period of time, the third correction processing can be conceivably terminated for the time being. Thus, the control unit 20 judges whether or not such a condition is satisfied.

Specifically, the control unit 20 first judges, as a first termination judgment condition, whether or not the value of the variable ta is set to the value (14 seconds) larger than the initial value through the processing of S54 or S61, and ΔT1 (=(current temperature T)−(reference temperature Tr1)) is smaller than the predetermined value (in this case, 1° C.). Here, the condition of ΔT1<1° C. is provided because the processing of correcting the control parameter is required as well when the temperature change has occurred to some extent after the central value Sc has been updated last, and the reference temperature Tr1 has been reset in the processing of S55 or S62. Examples of the cases where this condition regarding the temperature is not satisfied include a case where a sharp temperature change occurs, and a case where the third correction processing is temporarily suspended due to an interrupt from other control processing or the like, and the processing is resumed from midway. When the first termination judgment condition is not satisfied, the control unit 20 resets the reference time t2 to the current time t, and then proceeds to subsequent processing of S6.

On the other hand, when the first termination judgment condition is satisfied, the control unit 20 further judges, as a second termination judgment condition, whether or not a time period of (current time t)−(reference time t2) is equal to or larger than a predetermined time period (in this case, 1 minute). When the condition of t−t2>1 (minute) is satisfied, this means that the state in which the update of the central value Sc is executed in different directions alternately has lasted for 1 minute or longer without the temperature change. In this case, the control unit 20 judges that the third correction processing is to be terminated for the time being, and then proceeds to processing of S9 described later. Conversely, when the second termination judgment condition is not satisfied, the control unit 20 proceeds to the processing of S6.

Subsequently, the control unit 20 changes the set value of the SA parameter to the added value Sp (=Sc+α), and then performs the collimator lens moving processing of moving the collimator lens 33 to the position corresponding to the added value Sp (S6). This processing is similar to the collimator lens moving processing of S3 illustrated in FIG. 7, except that the set value of the SA parameter is changed to the added value Sp instead of to the subtracted value Sm in S24.

After the collimator lens 33 is moved to the position corresponding to the added value Sp, the control unit 20 subsequently performs the jitter value measurement/comparison processing (S7). This processing is similar to the jitter value measurement/comparison processing of S4 illustrated in FIGS. 8 to 10 except that: in S35 and S36, the array variable for storing the results of measuring the jitter values is Jp[y] instead of Jm[y]; and in S40, the judgment target is Jm[0] instead of Jp[0]. With this configuration, the jitter values are measured for the case where the added value Sp is set, and when the jitter value is already stored in Jm[y], a comparison is further made between the jitter value Jp[y] measured based on the added value Sp and the jitter value Jm[y] measured based on the subtracted value Sm.

After the jitter value measurement/comparison processing of S7 is finished, the control unit 20 subsequently judges whether or not the processing termination condition is satisfied as in S5 (S8). Similarly to S5, this judgment processing is performed by using the first termination judgment condition and the second termination judgment condition as well. As a result of the judgment, when it is judged that the processing termination condition is not satisfied, the control unit 20 returns to S3 to continue repeating the third correction processing. On the other hand, when it is judged that the processing termination condition is satisfied, the control unit 20 judges that the third correction processing is to be terminated for the time being, and then proceeds to the processing of S9.

When it is judged in S5 or S8 that the processing termination condition is satisfied, it is estimated that the central value Sc substantially coincides with the optimal value So, but, at that time, the set value of the SA parameter should be set to any one of the subtracted value Sm and the added value Sp. Accordingly, the control unit 20 executes the collimator lens moving processing, to thereby perform control of returning the set value of the SA parameter to the central value Sc (S9). This processing may be similar to the collimator lens moving processing executed in S3 or S6 except that in S24, the set value of the SA parameter is changed to the central value Sc obtained at that time. After the control, the control unit 20 returns to S1, and waits for a state in which the third correction processing becomes necessary again due to the change of the current temperature T from the reference temperature Tr1.

Note that, in the description above, the third correction processing is a sequence of processing which is executed successively, but, as described above, there is a case where the third correction processing is suspended due to control operation (for example, seek control) other than the reading operation or the pause control because the third correction processing is executed while the device is being used. In view of the above, in order that the correction processing can be resumed from midway even when such suspension has occurred, a counter variable indicating the state of progress of the processing may be prepared, and the counter variable may be incremented with every progress of processing step. With this configuration, even when the processing is suspended, it is possible to resume the processing afterward at a resumption timing by referring to the counter variable.

Further, in the case where the optical disc medium M includes a plurality of data recording layers, there is a case where an instruction is given by the host to read information from a data recording layer different from the data recording layer on which the reading has been performed so far. In such a case, because each data recording layer has a different optimal value So of the SA parameter, the third correction processing needs to be executed independently by using a separate variable with respect to each of the plurality of data recording layers. Thus, when an instruction is given to perform an inter-layer jump from the data recording layer from which information has been read so far (previous data recording layer) to another new data recording layer (new data recording layer), the third correction processing with respect to the previous data recording layer is suspended, and the third correction processing with respect to the new data recording layer is performed. In this case, the correction processing may be executed again from S1 of FIG. 6 instead of resuming the processing from the point of the previous suspension.

According to the optical disc device 1 of the second embodiment described above, even when the reading of information from the optical disc medium M is being performed, it is possible to perform the correction processing so that the set value of the control parameter follows the optimal value So.

Note that, the processing flows and the various constants used for the control in the description above are all examples. Further, the values defined as predetermined constants in the description above may be changed according to, for example, the operation state of the optical disc device 1. For example, when the amount of temperature change per unit time inside the device is large, it is necessary to perform the correction so that the set value converges to the optimal value So quicker. Conversely, when the amount of temperature change is small, in some cases, it is preferred that the collimator lens 33 not be moved frequently. Accordingly, the following values may be changed according to the rate of the temperature change or the elapsed time since the start of using the device. Those values are, for example, the upper limit values of the counter variables x and y defining the number of times the jitter value is measured and the number of the jitter values to be compared, the unit amount u representing the change amount of the central value Sc when the update processing is performed once, and the threshold th for determining that the update processing is to be performed. Further, according to the frequency of occurrence of a reading error per unit time, the number of times the jitter value is measured, the threshold th, and the like may be changed.

COMBINATION EXAMPLE

The correction processing of the optical disc device according to the first embodiment and the correction processing of the optical disc device according to the second embodiment, which have been described above, may be executed in combination. If the third correction processing described above is suspended for a long period of time due to other control processing or the like, the control parameter may not be corrected effectively even when the third correction processing is resumed afterward. For example, in a case where there has been no command received from the host for a given period of time, and the optical disc device 1 has entered into a standby state (state in which the operation of the spindle motor 12 and the optical pickup 13 is stopped), the temperature is likely to have been changed significantly from that at the time of entering into the standby state when the optical disc device 1 recovers from the standby state afterward. In such a case, even when the third correction processing is performed so as to gradually correct the central value Sc, there is a fear that a reading error or the like occurs due to a gap between the central value Sc and the optimal value So before such correction is performed. To address this, before the reading operation is started, the optical disc device 1 may execute the first correction processing or the second correction processing described in the first embodiment according to the current temperature T.

Figure 11:
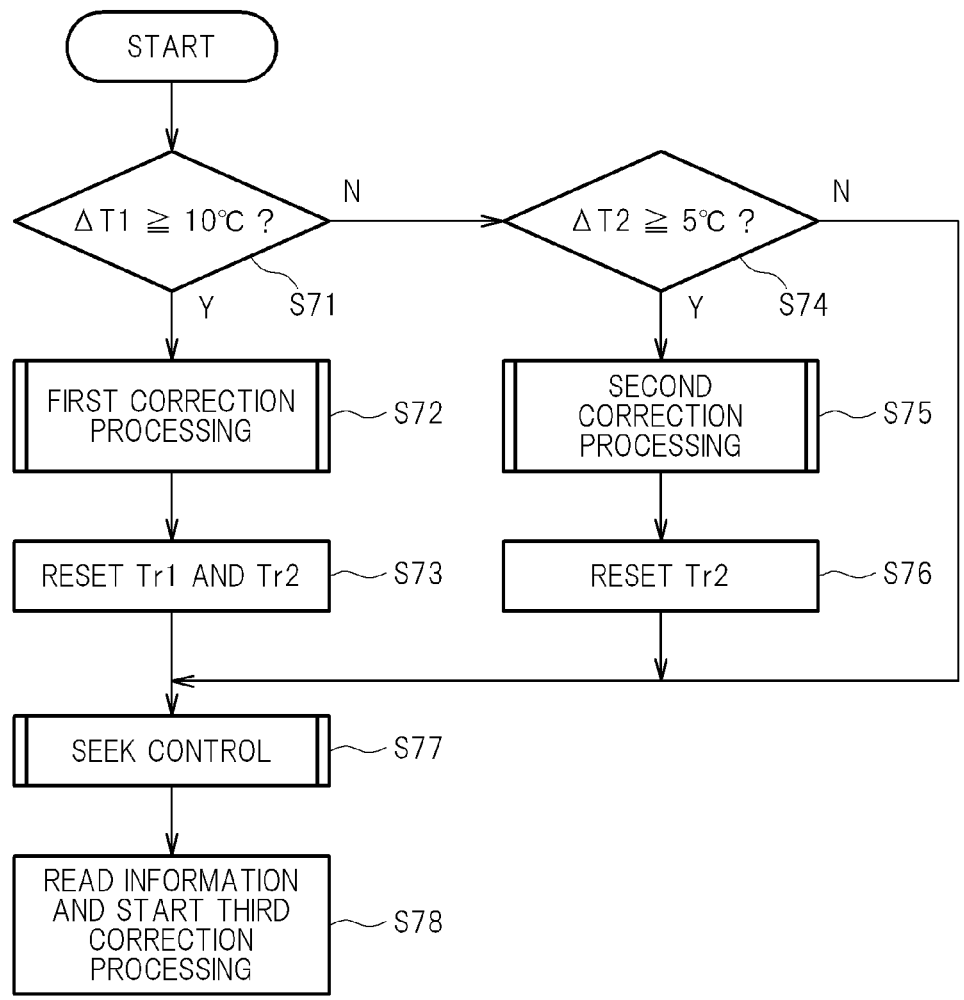
[FIG. 11] A flow chart illustrating an example of a flow of processing performed when first correction processing, second correction processing, and third correction processing are used in combination.

FIG. 11 is a flow chart illustrating an example of control performed when the first correction processing, the second correction processing, and the third correction processing are combined as described above. In the example of this figure, when the information reading command is received from the host, the control unit 20 first judges whether or not the difference $\Delta T1$ between the current temperature T and a first reference temperature Tr1 is equal to or larger than a predetermined value (in this case, 10° C.) (S71). Then, when the judgment condition is satisfied, it is determined that high-accuracy correction is necessary because a large temperature change has occurred, and hence the first correction processing is executed (S72). After that, the first reference temperature Tr1 and a second reference temperature Tr2 are reset to the current temperature T (S73). Note that, in this example, the first reference temperature Tr1 corresponds to a temperature obtained when the initial adjustment processing or the previous first correction processing was executed, and the second reference temperature Tr2 corresponds to a temperature obtained when any one of the initial adjustment processing, the first correction processing, and the second correction processing was executed last time.

On the other hand, when the judgment condition of S71 is not satisfied, the control unit 20 judges whether or not a difference $\Delta T2$ between the current temperature T and the second reference temperature Tr2 is equal to or larger than a predetermined value (in this case, 5° C.) (S74). Then, when this judgment condition is satisfied, the second correction processing is executed (S75), and only the second reference temperature Tr2 is reset to the current temperature T (S76). On the other hand, when the judgment condition is not satisfied, the control unit 20 determines that no correction processing is necessary, and then proceeds to S77.

After that, the control unit 20 executes the seek control of moving the optical pickup 13 to the reading position of the information specified by the information reading command from the host (S77). After the seek control is completed, the control unit 20 starts the reading of the information from the optical disc medium M, and also starts the execution of the third correction processing (S78). As described above, the third correction processing is executed continuously until the third correction processing is suspended due to a new control command or the like, and when the information reading command is issued again from the host after the suspension, the processing is executed again from S71. For this reason, when the time period of the suspension is long, and when the temperature change has occurred during that period, the first correction processing or the second correction processing is selectively executed according to the extent of the temperature change. Note that, the first correction processing and the second correction processing are herein selectively executed, but only one of the first correction processing and the second correction processing may be executed according to the temperature change.

Further, even during the execution of the third correction processing, when the temperature change or the like has occurred, the control unit 20 may execute the first correction processing or the second correction processing as necessary. For example, every time the processing of each step of the third correction processing is executed, the control unit 20 may judge whether or not the current temperature T has changed by a predetermined value or larger from the second reference temperature Tr2, and may execute the second correction processing when the current temperature T has changed by the predetermined value or larger. With this configuration, for example, when a long period of time has elapsed without a judgment that the measurement is successful in S34 of FIG. 8, due to repeated failures to measure the jitter value, the occurrence of a reading error or the like can be avoided by correcting the control parameter by a method different from the third correction processing. Note that, in this example, while the control parameter is updated normally through the third correction processing, there is no need to execute the second correction processing, and hence the second reference temperature Tr2 needs to be reset every time the central value Sc is updated. Specifically, for example, the control unit 20 adds the second reference temperature Tr2 as a variable to be initialized in S2 of FIG. 6, and also, in addition to updating the first reference temperature Tr1 in each processing of S55, S57, S62, and S64 of FIG. 10, resets the second reference temperature Tr2 to the current temperature T at the time of the corresponding processing.

Note that, in the description of the optical disc device according to each embodiment given above, the control parameter is assumed to be the SA parameter related to spherical aberration correction, but another control parameter than the SA parameter may be corrected by the optical disc device according to the embodiments of the present invention. For example, the optical disc device executes servo control, such as focus servo or tracking servo, under the operation condition defined by various servo control parameters including the SA parameter so as to maintain a state in which the focal point of light from the objective lens 36 coincides with the reading position while information is read. Thus, the set values of those servo control parameters may be set as targets of the correction processing. Further, the evaluation value used for evaluating the reading accuracy is not limited to the jitter value, and another indicator such as an RF amplitude may be used.

The invention claimed is:

1. An optical disc device for reading information recorded on an optical disc medium under an operation condition corresponding to a value set with respect to a predetermined control parameter, the optical disc device comprising:
   a correction portion for correcting the value of the predetermined control parameter by repeatedly executing, while an operation of reading the information from the optical disc medium is being performed, a process of:
   acquiring, with respect to each of two values of the predetermined control parameter, a plurality of evaluation values of a same kind, each evaluation value indicating accuracy of the reading of the information from the optical disc medium, where one of the two values is to one side of the of the predetermined control parameter by a predetermined amount and the other of the two values is to an opposite side of the predetermined control parameter by the predetermined amount;
   updating the value of the predetermined control parameter in a direction towards the one side or the opposite side based on comparing the plurality of the evaluation values acquired for each of the two values of the predetermined control parameter; and
   setting a variable which indicates the direction toward which the predetermined control parameter was updated,
   wherein the correction portion executes seek control in response to an information reading command from a host, and subsequently and periodically carries out the acquiring, updating, and setting process to update the value of the predetermined control parameter, with reference to the variable, in parallel with reading the information from the optical disc medium.

2. The optical disc device according to claim 1, wherein the correction portion determines whether the value of the predetermined control parameter is to be increased or decreased based on a magnitude relation between the two evaluation values acquired with respect to the two values of the predetermined control parameter, respectively.

3. The optical disc device according to claim 1, wherein the correction portion acquires, as one of the evaluation values, a value calculated based on a reproduction signal obtained through the operation of reading the information from the optical disc medium.

4. A method of controlling an optical disc device for reading information recorded on an optical disc medium under an operation condition corresponding to a value set with respect to a predetermined control parameter, the method comprising:
   correcting the value of the predetermined control parameter by repeatedly executing, while an operation of reading the information from the optical disc medium is being performed, a process of:
   acquiring, with respect to each of two values of the predetermined control parameter, a plurality of evaluation values of a same kind, each evaluation value indicating accuracy of the reading of the information from the optical disc medium, where one of the two values is to one side of the of the predetermined control parameter by a predetermined amount and the other of the two values is to an opposite side of the predetermined control parameter by the predetermined amount;
   updating the value of the predetermined control parameter in a direction towards the one side or the opposite side based on comparing the plurality of the evaluation values acquired for each of the two values of the predetermined control parameter; and
   setting a variable which indicates the direction toward which the predetermined control parameter was updated,
   wherein the correcting step includes a seek control process in response to an information reading command from a host, and subsequently and periodically carrying out the acquiring, updating, and setting steps to update the value of the predetermined control parameter, with reference to the variable, in parallel with reading the information from the optical disc medium.

5. A non-transitory, computer-readable information storage medium having stored therein a program for controlling an optical disc device for reading information recorded on an optical disc medium under an operation condition corresponding to a value set with respect to a predetermined control parameter, the program causing a computer to function as:
   a correction portion for correcting the value of the predetermined control parameter by repeatedly executing, while an operation of reading the information from the optical disc medium is being performed, a process of:
   acquiring, with respect to each of two values of the predetermined control parameter, a plurality of evaluation values of a same kind, each evaluation value indicating accuracy of the reading of the information from the optical disc medium, where one of the two values is to one side of the of the predetermined control parameter by a predetermined amount and the other of the two values is to an opposite side of the predetermined control parameter by the predetermined amount;
   updating the value of the predetermined control parameter in a direction towards the one side or the opposite side based on comparing the plurality of the evaluation values acquired for each of the two values of the predetermined control parameter; and
   setting a variable which indicates the direction toward which the predetermined control parameter was updated,
   wherein the correction portion executes seek control in response to an information reading command from a host, and subsequently and periodically carries out the acquiring, updating, and setting process to update the value of the predetermined control parameter, with reference to the variable, in parallel with reading the information from the optical disc medium.

6. An optical disc device for reading information recorded on an optical disc medium under an operation condition corresponding to a value set with respect to a predetermined control parameter, the optical disc device comprising:
   a measurement unit for measuring a temperature inside the optical disc device;
   a first correction portion for correcting the value of the predetermined control parameter by evaluating accuracy of the reading of the information from the optical disc medium;
   a second correction portion for correcting the value of the predetermined control parameter based on the temperature measured by the measurement unit and a predetermined constant value; and
   a correction control portion for selectively causing any one of the first correction portion and the second correction portion to execute the correction of the value of the predetermined control parameter at every predetermined timing after the reading of the information from the optical disc medium is started,
   wherein the correction control portion causes: (i) the second correction portion to execute the correction a predetermined number of times every time the temperature inside the optical disc device changes by a predetermined first amount, (ii) the first correction portion to thereafter execute the correction every time the temperature inside the optical disc device changes by a predetermined second amount, where the second amount is greater than the first amount, and (iii) repeating (i) and (ii).

7. The optical disc device according to claim 6, wherein the correction control portion causes the correction of the value of the predetermined control parameter to be executed at every timing corresponding to a change in the temperature measured by the measurement unit.

8. The optical disc device according to claim 7, wherein the correction control portion causes the correction of the value of the predetermined control parameter to be executed at every timing when a predetermined condition regarding a reading operation is satisfied for a first time after a predetermined temperature change is measured by the measurement unit.

9. A method of controlling an optical disc device for reading information recorded on an optical disc medium under an operation condition corresponding to a value set with respect to a predetermined control parameter, the optical disc device comprising a measurement unit for measuring a temperature inside the optical disc device, the method comprising:
   correcting the value of the predetermined control parameter selectively through any one of first correction processing and second correction processing at every predetermined timing after the reading of the information from the optical disc medium is started, wherein:
   the first correction processing comprising correcting the value of the predetermined control parameter by evaluating accuracy of the reading of the information from the optical disc medium, and
   the second correction processing comprising correcting the value of the predetermined control parameter based on the temperature measured by the measurement unit and a predetermined constant value, and
   the correction control portion causes: (i) the second correction portion to execute the correction a predetermined number of times every time the temperature inside the optical disc device changes by a predetermined first amount, (ii) the first correction portion to thereafter execute the correction every time the temperature inside the optical disc device changes by a predetermined second amount, where the second amount is greater than the first amount, and (iii) repeating (i) and (ii).

10. A non-transitory, computer-readable information storage medium having stored therein a program for controlling an optical disc device for reading information recorded on an optical disc medium under an operation condition corresponding to a value set with respect to a predetermined control parameter, the optical disc device comprising a measurement unit for measuring a temperature inside the optical disc device, the program causing a computer to function as:
   a first correction portion for correcting the value of the predetermined control parameter by evaluating accuracy of the reading of the information from the optical disc medium;
   a second correction portion for correcting the value of the predetermined control parameter based on the temperature measured by the measurement unit and a predetermined constant value; and
   a correction control portion for selectively causing any one of the first correction portion and the second correction portion to execute the correction of the value of the predetermined control parameter at every predetermined timing after the reading of the information from the optical disc medium is started,
   wherein the correction control portion causes: (i) the second correction portion to execute the correction a predetermined number of times every time the temperature inside the optical disc device changes by a predetermined first amount, (ii) the first correction portion to thereafter execute the correction every time the temperature inside the optical disc device changes by a predetermined second amount, where the second amount is greater than the first amount, and (iii) repeating (i) and (ii).

11. The optical disc device of claim 1, wherein:
   the correction portion carries out an initial adjustment process to update the value of the predetermined control parameter prior to reading the information from the optical disc medium in response to the information reading command, and
   an incremental change amount by which the value of the predetermined control parameter is updated at any one time is smaller during the reading of the information from the optical disc medium than during the initial adjustment process.

\* \* \* \* \*